US010225080B2

(12) United States Patent
Drost et al.

(10) Patent No.: US 10,225,080 B2
(45) Date of Patent: Mar. 5, 2019

(54) METHOD AND SYSTEMS FOR ROUTING ENTANGLED PHOTONS TO QUANTUM NETWORK USERS VIA A RECONFIGURABLE SWITCH NETWORKS OF OPTICAL CROSSBAR SWITCHES

(71) Applicant: U.S. Army Research Laboratory ATTN: RDRL-LOC-I, Adelphi, MD (US)

(72) Inventors: Robert James Drost, Washington, DC (US); Terrence Joseph Moore, Silver Spring, MD (US); Michael Brodsky, Milburn, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/590,828

(22) Filed: May 9, 2017

(65) Prior Publication Data
US 2018/0152295 A1    May 31, 2018

Related U.S. Application Data

(60) Provisional application No. 62/427,236, filed on Nov. 29, 2016.

(51) Int. Cl.
*H04B 10/70* (2013.01)
*H04L 9/08* (2006.01)
*H04M 99/00* (2006.01)

(52) U.S. Cl.
CPC .......... *H04L 9/0855* (2013.01); *H04B 10/70* (2013.01); *H04L 9/0858* (2013.01); *H04M 99/00* (2013.01);

(Continued)

(58) Field of Classification Search
CPC ................. H04B 10/70; G02F 1/225
See application file for complete search history.

(56) References Cited

U.S. PATENT DOCUMENTS

| 5,798,580 | A  | * | 8/1998 | Morozov | ............. H04L 49/254 307/112 |
| 6,292,597 | B1 | * | 9/2001 | Lagali | ............... G02B 6/12011 385/1 |

(Continued)

OTHER PUBLICATIONS

Hall, Matthew, "Ultrafast Switching of Photonic Entanglement," American Physical Society Physical Review Letters, PRL 106, 053901 (2011).

(Continued)

*Primary Examiner* — Cindy Trandai
(74) *Attorney, Agent, or Firm* — Eric Brett Compton

(57) ABSTRACT

Quantum networking systems and methods for routing entangled photons pairs are described herein. One quantum networking system includes entangled photon sources which generate entangled photons; optical output ports; a reconfigurable switching network connecting to the entangled photon sources and the output ports, which include a regular repeating structure of optical crossbar switches and interconnections for selectively routing individual ones of entangled photons pairs input to the network to and amongst the outputs; and a control module. The control module is configured to receive a request for entangled photons at the output ports; execute a routing algorithm to determine the state of the switches in the reconfigurable switching network to satisfy the request; and generate and transmit control signals to the switching network in order to set the states of the switches according to the executed routing algorithm. The reconfigurable switching network may be a Beneš or a banyan-type network architecture.

19 Claims, 12 Drawing Sheets

(52) U.S. Cl.
CPC ... *G02B 2207/114* (2013.01); *H04M 2201/60* (2013.01); *H04M 2207/20* (2013.01)

(56) References Cited

U.S. PATENT DOCUMENTS

| | | | | |
|---|---|---|---|---|
| 6,456,620 | B1* | 9/2002 | Wang | H04L 49/1507 370/351 |
| 6,567,858 | B1* | 5/2003 | Yang | H04Q 11/0005 709/238 |
| 8,311,221 | B2 | 11/2012 | Brodsky et al. | |
| 8,391,282 | B1* | 3/2013 | Lu | H04L 1/22 370/248 |
| 8,457,316 | B2 | 6/2013 | Brodsky et al. | |
| 8,837,735 | B2 | 9/2014 | Brodsky et al. | |
| 8,861,735 | B2* | 10/2014 | Brodsky | H04B 10/70 380/256 |
| 9,491,120 | B2* | 11/2016 | Mehrvar | H04L 49/25 |
| 2007/0047444 | A1* | 3/2007 | Leroy | H04L 12/5601 370/235 |
| 2012/0235839 | A1* | 9/2012 | Mazumdar | H04L 49/15 341/50 |
| 2013/0028552 | A1* | 1/2013 | DeSalvo | H03H 2/003 385/2 |
| 2013/0282636 | A1* | 10/2013 | Macready | G06N 99/002 706/46 |
| 2014/0153926 | A1 | 6/2014 | Mower et al. | |
| 2016/0105439 | A1* | 4/2016 | Hunt | H04B 10/70 726/4 |
| 2016/0112192 | A1* | 4/2016 | Earl | H04L 9/0858 380/44 |
| 2016/0227300 | A1* | 8/2016 | Lai | H04Q 11/0005 |
| 2016/0381443 | A1* | 12/2016 | Mehrvar | H04Q 11/0066 398/26 |
| 2017/0064417 | A1* | 3/2017 | Mehrvar | H04Q 11/0003 |
| 2017/0115514 | A1* | 4/2017 | Rad | G02B 6/2861 |
| 2017/0176688 | A1* | 6/2017 | Mehrvar | G02B 6/3542 |

OTHER PUBLICATIONS

Huang, Yu-Ping, et al., "Quantum theory of all-optical switching in nonlinear Sagnac interferometers," New Journal of Physics, IOP Publishing Ltd and Deutsche Physikalische Gesellschaft, 14 (2012) 053038.
Kabacinski, Wojciech, "Nonblocking electronic and photonic switching fabrics," Springer Science+Business Media, Inc. pp. 22, 32, 33, 65-71, 162-166 (2005).
Offerman, D.C., et al. "On a Class of Rearrangeable Switching Networks Part I: Control Algorithm" The Bell System Texhnical Journal, 1579-1600 (Dec. 1, 1970).
I. Herbauts, B. Blauensteiner, A. Poppe, T. Jennewein, and H. Hubel, "Demonstration of active routing of entanglement in a multi-user network," Appl. Opt., vol. 21, pp. 29 013-29 024, Nov. 2013.
Luo, M.. et al. Controlled Photon Switch Assisted by Coupled Quantum Dots. Sci. Rep. 5, 11169; doi: 10.1038/srep11169 (2015).
Bourouha, Mohamed A. "Advances in Optical Switching and Networking: Past, Present and Future," Proceedings IEEE SoutheastCon 2002.
Poppe, A., et al. "Entanglement Generation and Routing in Optical Networks," ECOC 2014, Cannes—France (2014).
Chang-Hua, Zhu, et al. "Block-free optical quantum Banyan network based on quantum state fusion and fission." Chinese Physics B 23.12 (2014): 120309.
J.I. Cirac, et al.,, "Quantum State Transfer and Entanglement Distribution among Distant Nodes in a Quantum Network," vol. 78, No. 16 Phy S I Cal Rev I Ew Letters Apr. 21, 1997.
Josef Gigimayr, "Optimization of planar all-optical mult 1-layer switching architectures,"Part ofthe SPJE Conference on Novel Optical Systems Desin and Ootimization II • San Diego. California • Jul. 1998 SPIE vol. 3430 • 0277-786X/98/.
Zhen Wang, et al. "Size consistency of tensor network methods for quantum many-body systems," Physical Review B 88, 121105(R) (2013).
Gu, Huaxi, et al. ODOR: A Microresonator-based High-performance Low-cost Router for Optical Networks-on-Chip, CODES+ISSS'08, Oct. 19-24, 2008, Atlanta, Georgia, USA.
Photop 2×2 Opto-Mechanical Switch Specifications, 253 Fuxin East Road, Fuzhou, Fujian 350014 P.R. China, revision A, 2008.
M. A. Bashar, et al., "Proposal for an efficient quantum key distribution system using entanglement" Computer and Information Technology, 2008. ICCIT 2008. 11th International Conference on (Conference date Dec. 24-27, 2008; published Mar. 21, 2009).
M. K. Shukla, R. Ratan, and A. Y. Oruc, "A quantum self-routing packet switch," in Proc. 38th Ann. Conf. Information Sciences and Systems, pp. 484-489, Mar. 2004.
Rahul Ratan, at al., "Quantum Switching Networks with Classical Routing," Information Sciences and Systems, 2007.
Grzegorz Danilewicz, et al., "Reduced Banyan-Type Multiplane Rearrangeable Switching Networks," IEEE Communications Letters, vol. 12, No. 12, Dec. 2008.
Nanotechnology for Telecommunications (Boca Ratio CRC press), eds. Anwar, S., et al., Chapter 15, I-Ming Tsai and Sy-Yen Kuo, An Architectural Perspective on Digital Quantum Switching, pp. 373-384. 2010.
Tsai M and Kuo S Y, Digital switching in the quantum domain, IEEE Trans. Nanotechnol. 1, 154, 2002.
Cheng T. and Wang C Y, "Quantum Switching and Quantum Merge Sorting," IEEE Transactions on Circuits and Systems—I: Regular Papers, vol. 53, No. 2, Feb. 2006.
Sue C C, "An Enhanced Universal N×N Fully Nonblocking Quantum Switch," IEEE Transactions on Computers, vol. 58, No. 2, Feb. 2009.
Rahul Ratan, Doctor of Philosophy, 2008, Dissertation: "Random Routing and Concentration in Quantum Switching Networks," University of Maryland, College Park, Abstract. (Full document available at: http://drum.lib.umd.edu/bitstream/handle/1903/9222/Ratan_umd_0117E_10089.pdf?sequence=1&isAllowed=y).
Manish Kumar Shukla, Doctor of Philosophy, 2010, Dissertation: "Quantum Switching Networks: Unicast and Multicast," University of Maryland, College Park, Abstract. (Full document available at: http://drum.lib.umd.edu/bitstream/handle/1903/10318/Shukla_umd_0117E_11154.pdf?sequence=1&isAllowed=y ).
Robert J. Drost, Terrence J. Moore, and Michael Brodsky, "Switching Networks for Pairwise-Entanglement Distribution," J. Opt. Commun. Netw., vol. 8., No. 5, May 2016, pp. 331-341.
Robert J. Drost and Michael Brodsky, "Design framework for entanglement-distribution switching networks," Quantum Communications and Quantum Imaging XIV, Proc. of SPIE vol. 9980, 998006, 2016.
U.S. Appl. No. 15/000,556 titled "Method and System of Network Switch Optimization," submitted by Robert J. Drost and Michael Brodsky filed Jan. 19, 2016.
Herbauts et al., "Demostration of active user routing of entanglement in a multi-user network;" Nov. 2013; OSA, pp. 29013-29024.
Ciurana et al., "Engtanglement distribution in Optical networks;" Jun. 2015; IEEE.

* cited by examiner

Optimal 8x8 network as disclosed in U.S. Patent Application No. 15/000,556

8x8 Banyan-type (Omega) network according to an embodiment

US 10,225,080 B2

METHOD AND SYSTEMS FOR ROUTING ENTANGLED PHOTONS TO QUANTUM NETWORK USERS VIA A RECONFIGURABLE SWITCH NETWORKS OF OPTICAL CROSSBAR SWITCHES

CROSS REFERENCE TO RELATED APPLICATION(S)

This application claims the benefit of U.S. Provisional Patent Application No. 62/427,236 filed Nov. 29, 2016 (hereinafter "the '236 provisional patent application"), herein incorporated by reference in its entirety for all purposes.

Additionally, this application relates to U.S. patent application Ser. No. 15/000,556 entitled "Method and System of Network Switch Optimization," submitted by Robert J. Drost and Michael Brodsky filed Jan. 19, 2016, herein incorporated by reference in its entirety (hereinafter "the '556 patent application"). In fact, aspects of both application have been previously disclosed in the published article: Robert J. Drost, Terrence J. Moore, and Michael Brodsky, "Switching Networks for Pairwise-Entanglement Distribution," J. Opt. Commun. Netw., Vol 8., No. 5, May 2016, pp. 331-341 (hereinafter "Drost et al. (2016)"). This paper was included in and formed the basis of the '236 provisional patent application.

STATEMENT OF GOVERNMENT INTEREST

The invention described herein may be manufactured, used, and licensed by or for the United States Government without the payment of royalties.

BACKGROUND OF THE INVENTION

Field

This invention relates to quantum networking, quantum communications, and quantum computing, and more particularly, to systems and methods for routing entangled photons to quantum network users via reconfigurable switch networks of optical crossbar switches.

Background

Quantum networks have the potential to enhance the utility of quantum protocols (for, e.g., cryptography, communication, computation, etc.) by enabling the interoperation of multiple quantum systems.

By exploiting peculiar features of quantum mechanics, quantum systems have the potential to deliver new capabilities beyond what is classically possible, and this potential fuels research interest in new areas of quantum computation, quantum communication, and quantum networking. Numerous applications, such as quantum illumination, synthetic aperture, quantum fingerprinting, and quantum appointment scheduling, have been proposed over recent years. The key underpinning feature is a quantum entangled state shared between distant parties. Hence, a critical component of a quantum network functionality is the distribution and the sharing of entanglement between remote network nodes.

In a star network architecture, which may itself be an element of a more complex network architecture, pairwise entanglement is generated at a central location with the help of nonlinear optical processes and then distributed to pairs of peripheral users located at the network edges. This enables many current protocols that make use of pairwise entanglement between parties, and multipartite higher order entanglement can also be constructed from two particle entanglement.

A simple 4×4 switching network for routing quantum entangled particle pairs was studied and described in Herbauts, B. et al., "Demonstration of active routing of entanglement in a multi-user network," Appl. Opt., vol. 21, pp. 29 013-29 024, November 2013, herein incorporated by reference in its entirety. Their switching network includes two switches, the positions of which yield only four possible network output configurations. This switching network is limited to only four outputs and users.

The aforementioned '556 patent application introduced optimized switching for more output configurations. This application showed how to define the interconnections of the switches in the switching network and how to determine states for the switches in that network that result in photon pairs being routed to an output according to that set of pairings. More particularly, the '556 patent application considered switching networks that are absolutely optimal in the sense that they provide all configurations of pairings at the output while using the minimum number of switches and minimizing a worst-case loss metric. Optimal network configurations were described for 6-, 8-, and 10-user networks. The associated routing algorithm involved a reverse lookup table, constructed by considering, in turn, each way in which the network switches could be set to determine and record the corresponding output pairings in, e.g., a table. Thus, given a particular desired output pairing, the table is searched for that pairing to determine a network state that was in correspondence.

The applicability of the '556 patent application, however, is fundamentally limited to networks of only a few users. That is because its methodology for determining the optimal network configuration employs a search strategy requiring the case-by-case examination of the possible ways in which the crossbar switches can be interconnected. In general, for networks with N=6, 8, 10, 12, 14, and 16 users, the number of ways in which the required number of switches could be interconnected is approximately $5 \times 10^4$, $1 \times 10^{10}$, $3 \times 10^{16}$, $3 \times 10^{25}$, $2 \times 10^{35}$, and $5 \times 10^{43}$, respectively. This exponential growth in complexity is a fundamental limitation and not merely a practical challenge that can be easily overcome with, e.g., advances in computational capabilities.

In addition, the previously-filed '556 patent application relies upon a reverse lookup table, the size of which is also fundamentally limited to small networks. As an example, consider a 128-user network. The number of possible pairings of these users, and hence the number of entries needed in a reverse lookup table, is approximately $2 \times 10^{107}$. Even for more moderately sized networks, the size of such a table is impractical. For example, a 32-user network would require a table with approximately $2 \times 10^{17}$ entries, corresponding to over an Exabyte of memory, which is quite exorbitant (to say the least). This demonstrates the infeasibility of creating such a large lookup table for large networks.

In view of the foregoing, improvements for distributing and routing entangled particles would be useful.

SUMMARY OF THE INVENTION

The present invention is directed to systems and methods for routing entangled photon pairs to network nodes, and more particularly to a reconfigurable switching network that enables any one node to share one of a pair of mutually exclusive entangled photons with any other node. The systems and methods enable any one user to share one of a pair of entangled photons with any other user while simultaneously allowing remaining users to also share an entangled pair with a desired user. Such an architecture can be implemented using conventional telecommunication network routing devices in a novel manner. The combination of optimal switching network structures and associated efficient routing algorithms represents a comprehensive solution to entanglement distribution.

Various quantum networking systems and methods for routing entangled photons pairs are described. According to embodiments, a quantum networking system includes one or more entangled photon sources which generate a plurality of entangled photon pairs; a plurality of optical output ports; a reconfigurable switching network connecting to the one or more entangled photon sources and the plurality of optical output ports, which comprises a regular repeating structure of optical crossbar switches and their interconnections for selectively routing individual ones of entangled photons pairs that are input to the network from the one or more entangled photon sources to and amongst the output ports; and a control module. The control module is configured to receive a request for entangled photons at the optical output ports; execute a routing algorithm to determine the state of the optical crossbar switches in the reconfigurable switching network to satisfy the request; and generate and transmit electronic control signals to the reconfigurable switching network in order to set the states of the optical crossbar switches according to the executed routing algorithm.

Each of the optical crossbar switches may have first and second inputs connected to adjacent interconnects feeding that switch and first and second outputs connected to adjacent interconnects exiting that switch. This arrangement enables each switch to be switchable between a first state in which the first switch input is connected to the first switch output and the second switch input is connected to the second switch output and a second state in which the first switch input is connected to the second switch output and the second switch input is connected to the first switch output. The one or more sources of entangled photon pairs outputting N/2 pairs of entangled photons may be configured to provide the N inputs to the network.

In some embodiments, the reconfigurable switching network may comprise an N×N Beneš network which is formed of 2 $\log_2$ N−1 stages, each of N/2 switches, for a total of N log 2 N−N/2 switches. The reconfigurable Beneš switching network may be a "reduced Beneš network," in some instances, in which the first stage of switches closest to the one or more entangled photon sources are removed and replaced with permanent connections replicating the "off" state of the switch such that there is a total of N $\log_2$ N−N switches.

The control module may execute a routing algorithm for the reconfigurable Beneš switching network comprising: sequentially defining a correspondence between photon labels and switch network outputs by repeatedly mapping the lowest unassigned positive photon label to the unassigned output with the lowest label, followed by mapping the corresponding negative photon label to the output that is to share entangled photon pairs with the previously determined output, and then repeating until all photon labels have been assigned, and performing a looping algorithm that for each photon label, routes the Beneš network input assigned to that photon label to the Beneš network output that is assigned to that photon label.

In other embodiments, the reconfigurable switching network may comprise an N×N banyan-type network which is formed of $\log_2$ N stages, each with N/2 switches, for a total of N/2 log 2 N switches. There are several varieties of banyan-type networks, such as the banyan, baseline, and omega networks. They are all essentially functionally equivalent, requiring only the intrastage reordering of switches (without breaking connections) to convert between them. Thus, the banyan-type network may be a reconfigurable banyan switch network, a reconfigurable baseline switch network, or a reconfigurable omega switch network.

In some further embodiments, the reconfigurable banyan-type switching network may be a "reduced banyan network" in which the one switch of each column of the network is removed and replaced by permanent connections replicating the "off" state of the switch such that there is a total of (N/2−1)$\log_2$ N switches.

The control module may execute a routing algorithm for the reconfigurable banyan-type switching network comprising: determining states of the switches in the $\log_2$ N stage of the banyan-type switching network, followed by the states of the switches in the ($\log_2$ N)−1 stage of the banyan-type switching network, followed by the states of the switches in the ($\log_2$ N)−2 stage of the banyan-type switching network, and so forth, until the switches in the first stage of the banyan-type switching network are set; for each stage of the banyan-type switching network, partitioning the switches into maximal disjoint cycles such that switches that are adjacent in a cycle have the property that, according to the already determined states of the switches in subsequent stages of the network, one output of each switch is routed to one of a pair of system optical output ports that, based on the communication signals received on the one or more communication input ports, are to transmit entangled photon pairs; and for each of the determined maximal disjoint cycles, determining states of the switches in the order that the switches appear in the cycle, setting the first switch of the cycle arbitrarily to either the cross state or the bar state, and then setting subsequent switch states so as to not prevent, according to the already determined states of the switches in subsequent stages of the network and the already determined states of the previously considered switches in the cycle, entangled photon pairs from being output on system optical output ports that, based on the communication signals received on the one or more communication input ports, are to transmit entangled photon pairs.

These and other embodiments of the invention are described in more detail below.

BRIEF DESCRIPTION OF THE DRAWINGS

The foregoing and other objects, features, and advantages of the invention will be apparent from the following more detailed description of non-limiting embodiments of the invention, as illustrated in the accompanying drawings, wherein:

FIG. 10A corresponds to the optimal 8×8 network system as was introduced in U.S. patent application Ser. No. 15/000,556. FIG. 10B is an 8×8 banyan-type network according to an embodiment of the present invention.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

Figure 1:
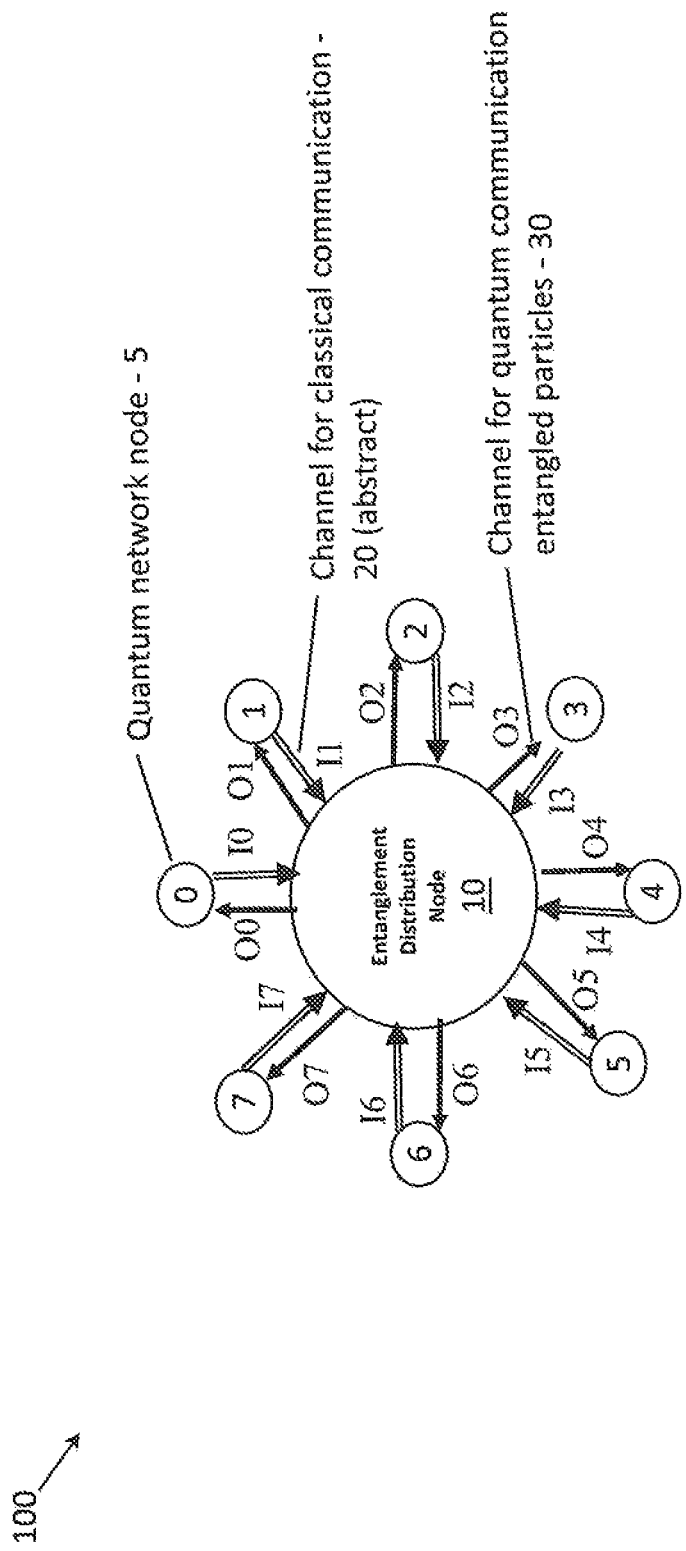
FIG. 1 depicts a schematic overview for a quantum networking system according to embodiments of the present invention.

FIG. 1 depicts a schematic overview for a quantum networking system 100 according to embodiments of the present invention. The quantum networking system 100 includes an entanglement distribution node 10 connecting and routing classical communication and quantum entangled particles amongst and between ones of a plurality of quantum network nodes 5.

In general, the nodes 5 represent users of respective quantum networking devices and are therefore also referred to as "user nodes" 5. As further discussed herein, the number of user nodes 5 in the quantum network may be characterized as N. Typically, N is a power of 2, i.e., $N=2^n$ for some natural number n. There are eight network nodes shown in FIG. 1 (N=8 or $2^3$). The user nodes 5 are numbered as 0, 1 ... 7, respectively. It should be appreciated, though, that the number of nodes is arbitrary. The users, which are labelled uniquely from the set $U:=\{0, 1, \ldots, N-1\}$, are abstractions of network nodes and, thus, may by physically near (e.g., in quantum computing networks) or distant (e.g., in quantum communication networks).

The entanglement distribution node 10 provides a reconfigurable routing network for on-demand pairwise entanglement distribution to the user nodes 5. More particularly, it selectively enables communication amongst and between the various user nodes 5 using both classical and quantum communication means.

Each user node 5 has an input and output channel to the entanglement distribution node 10 for communications. The input and output of each user node 5 are connected to the entanglement distribution node 10 via appropriate communications channels. The outputs from the user nodes 5 to the entanglement distribution node 10 may be made by a classical communication channel 20. Such a channel may be defined as using conventional electrical and/or optical signals for communication means.

The outputs from the entanglement distribution node 10 to the user nodes 5 may be made by a quantum communication channel 30. Such a pathway may enable quantum information to be shared, such as entangled photons. The quantum communication channel 30 may include fiber optics, for instance.

The user nodes 5 communicate using quantum information amongst one another via the quantum network. More particularly, each of the user nodes 5 can make requests to the quantum entanglement distribution node 10 when its wishes to receive quantum information from another user node 5 in the network. The "inputs" to the quantum entanglement distribution node 10 indicate that a requesting user node wants to receive entangled photon pairs with a particular user node. The "outputs" from the entanglement distribution node provide the requested entangle pairs amongst the user nodes. The desired entangled photon pairings is referred to an "entanglement request." When an "entanglement request" from one user node is made for quantum information from another user node in the quantum network, the quantum entanglement distribution node will couple entangled photon pairs between the requesting user node and the requested user node. Put another way, as requests are made, the quantum entanglement distribution node will produce entangled photon pairs with the appropriate entanglement pairings between the requesting user node and the requested user node.

Figure 2:
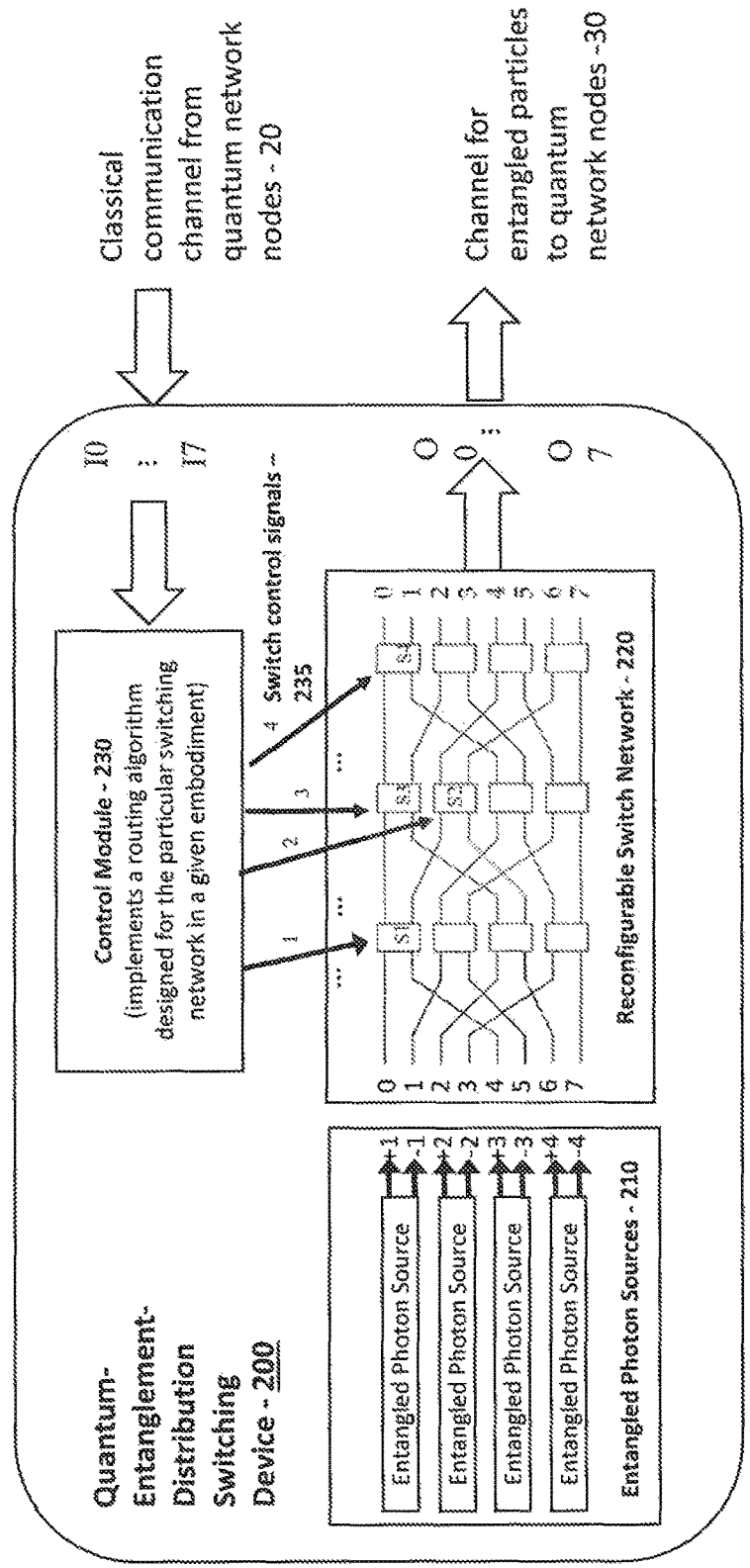
FIG. 2 depicts a schematic of a reconfigurable and scalable quantum switching network of a quantum networking system according to embodiments of the present invention.

FIG. 2 depicts a schematic of a reconfigurable and scalable quantum switching network system 200. It forms the quantum entanglement distribution node 10 of the quantum networking system 100 of FIG. 1 according to embodiments of the present invention. The quantum switching network system 200 generally includes a source (or sources) for producing entangled photon pairs 210, a reconfigurable switch network 220, and a control module 230.

The source (or sources) 210 produce entangled photon pairs. The entangled pairs can be produced by any process, such as, but not limited to, spontaneous parametric down conversion in nonlinear media. Each photon of a single photon pair is to be emitted at approximately the same time. For example, the source (or sources) may be each implemented as one or more laser sources and/or optics, such as mirrors or beam splitter, separately route or direct respectively ones of each of the entangled photon pairs produced by the laser(s) to the reconfigurable switch network 220.

Two sets of entangled photon pairs emitted from the same pair of output ports are generally to be emitted with sufficient delay so that the two pairs of photons are distinguishable. This delay can be fixed or random, where the random delay might arise from, for example, random times of photon creation. In the case of a random delay, it is acceptable for the delay to be on occasion too short to allow different entangled photon pairs to be distinguished, with the understanding that this situation must be detected and appropriately handled (e.g., by rejecting the indistinguishable pair) by the network users or another network component. Independent of the timing of photon emissions on a pair of output ports that output entangled photons, no timing relationship is assumed to exist between the emissions of photons emitted at pairs of output ports not producing entangled pairs.

In most implementations, it is envisioned that N/2 sources generate N/2 pairs of entangled photon pairs. Beginning with a set of N/2 sources of random entangled photon pairs, the sources are labeled $\{1, 2, \ldots, N/2\}$, with the kth source having two outputs labeled +k and −k, each carrying one photon for every photon pair output by source k. The individual photons are labeled with the labels of the corresponding outputs, denoting the set of these labels by K:={+1, 2, ..., ±N/2}. In practice, fewer than N/2 sources might be capable of producing the desired photon pairs. For example, certain nonlinearities can generate photon pairs at different but fixed wavelengths from a single laser source. Upon demultiplexing of the wavelengths, there are N outputs that carry photon pairs with fixed entanglement properties as above.

Photon labels $\pm k \in K$ refer to all photons emitted by source k and not necessarily to any particular pair of photons from source k. Thus, in embodiments for the routing of photons, under consideration is the routing of all photons emitted from the corresponding source output, where the emission times might be unknown, random, and/or asynchronous with other sources. In the following, to simplify the presentation, the disclosure focuses on the routing a particular pair of photons from each source, but the invention encompasses a broader applicability implicitly. The entangled photon pairs produced by the sources 210 are input along separate paths or channels into the reconfigurable switch network 220. In FIG. 2, photon-source outputs +1, −1, +2, −2, etc. are connected to inputs of the network 220.

The reconfigurable switch network 220 couples the various nodes 5 of the quantum network. It comprises a plurality of optical switches and their interconnections. More particularly, the network 220 receives entangled particle pairs as inputs, from the sources 210, and selectively routes or directs individual ones of the entangled particle pairs to quantum channels. For N input and N output ports there are multiple switching configurations that can be used to selectively deliver entangled photons on demand. As FIG. 2 depicts, N inputs corresponding to N/2 pairs of entangled photons from the sources 210 map to a set of N outputs correspond to users such that each user receives one of an entangled photon pair. Because entangled photons are very sensitive to loss of entanglement, it may be desirable, and an objective of the present invention, to deliver a pair of the entangled photons to each of the N ports for any pairing of the ports using a minimum number of switches in any stream. The minimum number of switches decreases potential for loss of photon and/or entanglement.

The reconfigurable switch network 220 comprises a plurality of optical switches and their interconnections. The optical switches may be conventional photonic switches in various implementations, for example. The interconnection may be implemented using fiber optics, mirrors, lenses and/or other optics for directing photons to, from and between the various switches. In general, each switch includes inputs from two optical interconnection lines and provides outputs to two optical interconnection lines. A particular switch can selectively switch the operable connection between the input interconnection lines and output interconnection lines in response to control signals 235 from the control module 230. This operation is further explained below with respect to FIG. 3. For the various network configurations illustrated in the graphical depictions which describe a network configuration, each switch is depicted by a square, and photon routes are depicted by lines, where photons are assumed to travel from left to right and intersecting lines do not necessarily imply a physical connection. In FIG. 2, twelve of switches are depicted, four of which have been labelled as S1, S2, S3 and S4 for ease of further explanation. Within each switch, parallel lines indicate photons travel through switch and cross lines indicate a crossover of the paths of photons. These parallel or crossed lines may be omitted in the depiction for clarity of presentation.

The reconfigurable switch network 220 is formed of a plurality of optical-mechanical switch elements. Such switches are building blocks for the construction of networks 220 and can be implemented either with discrete components or in an integrated fashion. For example, 1×1, 1×2, 2×2, or 2×3 MEMS-switch cubes from Huber+Suhner Cube Optics AG (Mainz, Germany) may be utilized. For ease of explanation, the various embodiments further discuss sets of 2×2 crossbar switches (unless otherwise stated). The 2×2 opto-mechanical crossbar switches are available commercially at low cost, exhibiting reasonable insertion loss of, e.g., less than 1 dB. However, the present invention is not limited to 2×2 crossbar switches and alternate switch designs are within the scope of the present invention.

The reconfigurable switch network 220 embodiments are based on known telecommunication switching network architectures based on a regularly repeatable structure of optical-mechanical switch. Such systems, in the past, have been used for optical routing information, such as for packet switching. This routing is in the classical sense. One key challenge in any switching network design is addressing "blocking," i.e., the possibility that a network state cannot produce a desired simultaneous routing of the inputs to the outputs. Traditional banyan-type networks used in conventional telecommunications system cannot be used as conventional reconfigurably non-blocking switching networks (that is, it is not possible to produce at the network output every permutation of the network input).

By contrast, the present invention routes quantum information by way of entangled photons. Embodiment of present invention employ the reconfigurable switch network to simultaneously route entangled-photon-pairs using simple and readily available optical crossbar switches. This is an entirely novel use for these systems. By using reconfigurable switching networks formed of optical crossbar switches arranged in regularly repeatable manner for the routing of entangle particle pairs of inputs, the switching networks can be employed without "blocking." This was contrary to the prevailing understanding in the art prior to the present invention. For instance, M. K. Shukla, R. Ratan, and A. Y. Oruc, "A quantum self-routing packet switch," in Proc. 38th Ann. Conf Information Sciences and Systems, pp. 484-489, March 2004, herein incorporated by reference in its entirety, reported using a banyan network for a particular quantum switching network application, but the desired non-blocking properties considered there were only achieved through the use of quantum switches, which are complex theoretical components. Also, the reduced Beneš network and the reduced banyan-type networks embodiments discussed below have not been previously considered in prior work due to properties of those networks that are undesirable for previously considered applications.

The control module 230, in general, implements a routing algorithm designed for the particular switching network in a given embodiment, for routing individual ones of entangled particle pair through the reconfigurable switching network 220. More particularly, it receives a request for entangled particle pairs for the various users. This request is made via a classical communication channel. In response, to receiving the request, the control modules 230 executes a routing algorithm to configure the individual switches of the reconfigurable switch network 220 to output entangled particles pairs in response to the request. The entangled particles pairs are output to the users via a quantum communication channel.

In the drawings, the N switch network inputs and the N switch network outputs are each distinctly labeled from I={0, 1, ..., N−1} and O={0, 1, ..., N−1}, respectively. (Note that as sets, U=I=O, but different variables may be employed as suggestive notation for clarity herein.) In FIG. 2, for instance, the eight inputs on the left side of the switch network 220 are labeled 0, 1, ..., 7, and the eight outputs on the right side of the switch network 220 are labeled 0, 1, ..., 7.

The (one-to-one) connections between the N photon-source outputs and the N switch network inputs is represented by a bijection from K to I. As used herein, the term bijection refers to a one-to-one relationship. The routing of photons from the switch network inputs to the switch network outputs can be changed by toggling component switch states. Similarly, the (one-to-one) connections between the N network outputs and the N users are also represented by a bijection from O to U; but without loss of generality (w.l.o.g.), it can be assumed that output i∈O is routed to user i∈U. For example, it can be assumed in FIG. 2 that the switch network 220 output labeled 1 is connected to the quantum entangled distribution switching device 200 output port labeled O1, which in turn is also represented by the output port O1 in the entanglement distribution node 10 of FIG. 1 and is hence therefore connected to quantum network node 5 with the label 1.

For some embodiments, the quantum network 100 may be configured in a "star network" architecture (as shown), that is, the nodes are circularly located and arranged with respect to one another in the network. In a star network architecture, pairwise entanglement is generated at a central location with the help of nonlinear optical processes and then distributed to pairs of peripheral users located at the network edges. This enables many current protocols that make use of pairwise entanglement between parties, and multipartite higher order entanglement can also be constructed from two particle entanglement. Of course, other nodal arrangements are certainly possible.

Given m switches of a switch network (e.g., 220) and their configuration, as defined, the entanglement distribution node 10 can satisfy an entanglement request f∈F if there exists a switch network state in which an entangled photon pair is routed to u and f(u) for each u∈U. Note, in particular, that once the switch network is placed in a network state satisfying a particular entanglement request, the routing of photons is static, as opposed to, for example, routing requiring high-speed toggling of switches depending on the particular photons that have been introduced into the network at a particular time. Until the users alter the entanglement request, the switch network remains in the given state, and subsequently introduced photon pairs continue to be routed to the corresponding users.

The number of switches is represented by "m", with the switches themselves labeled uniquely from $\{1, 2, \ldots, m\}$. The state of the network is represented by "s"=$[s_1 \ s_2 \ \ldots \ s_m]^T \in S_m$, where $S_m$ is the set of all possible switch network states and is thus the set $\{0, 1\}^m$. If the state of the switch network has $s_i=0$ or $s_i=1$, the ith switch is "off" or "on", respectively. Each of the $2^m$ network states implies a bijection $g_s$ such that user i receives photon $g_s(i)$ when the network is in state s. The state s and the implied bijection $g_s$ are said to satisfy f∈F if $g_s(f(i))=-g_s(i)$ for all i. Also, defining $G:=U_{s\in S_m} g_s$, the request f∈F is satisfiable if there exists g∈G that satisfies f, and if every f∈F is satisfiable for a given network configuration, then that configuration is admissible. For a particular network configuration and entanglement request f∈F, let $S_f \subseteq S_m$ be the set of network states that satisfy f. Assume that the network configuration is feasible, so that $S_f \neq \emptyset$ for all f∈F. For a network state $s \in S_f$, the number of switches that a photon routed to user u∈U passes through is d(f,s,u). One objective of the present invention is to provide feasible switch networks.

The control module 230 is a controller and may include one or more processors (or micro-processors) that are configured to execute the routing algorithm methods (e.g., 500 or 800) in response to requests for entangled photons. It generates electrical control signals 235 as needed for setting and controlling the state of all of the switches of the reconfigurable switch network 220. Each switch receives an individual control signal 235. In FIG. 2, four control signals 235 are illustratively depicted as 1, 2, 3, and 4 which control switches S1-S4.

The routing algorithm method executed by the control module 230 are processor-executable instructions can be stored in a memory device and execute by the processors when needed. In some implementations, software code (instructions), firmware, or the like, may be stored on a computer or machine-readable storage media having computer or machine-executable instructions executable by the processor(s). The processor(s) may be a programmable processor, such as, for example, a field-programmable gate array (FPGA), an application-specific integrated circuit (ASIC) processor, or other known computing processor. The routing methodologies disclosed herein may be implemented and executed by an application that may be created using any number of programming languages. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Figure 3:
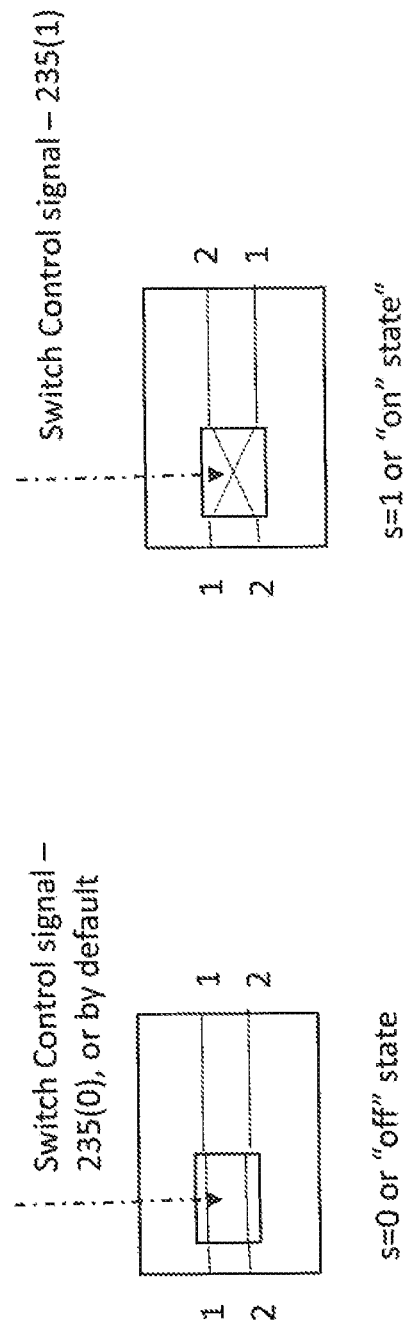
FIG. 3 illustrates a schematic of states of an exemplary 2×2 optical crossbar switch used in the reconfigurable switch network according to embodiments of the present invention.

FIG. 3 illustrates a schematic of states of an exemplary 2×2 optical crossbar switch having two input ports, two output ports, and a control input signal used in the reconfigurable switch network according to embodiments of the present invention. The switch is illustratively depicted by a rectangle box and photon routes are depicted by horizontal lines, where photons are assumed to travel from left to right. The lines external to the switches show how the switches are interconnected, whereas lines within a switch depict the possible routing of photons depending on the switch state. The action of the switch is controlled by a switching control signals 235 generated by the control module 230 as further discussed below.

Specifically, in FIG. 3, parallel lines depict the routing of photons when the switch is in the first state (s=0) and crossed lines depict the routing of photons when the switch is in the second state (s=1). (The lines within the switches are omitted elsewhere herein for clarity of presentation.) This may be thought of as turning the switch "on" or "off" such that the switch is in the "off" (normally parallel state, s=0) or "on" (alternately bar and cross state, s=1), respectively. The former state may occur with an "off" control signal 235(0) from control module (or by default), whereas the latter state may occur an "on" control signal 235(1) from the control module.

A signal input to the first (second) input port emerges at the first (second) output port when the switch is in the "off" state, i.e., s=0, and emerges at the second (first) output port when the switch is in the "on" state, i.e., s=1. For ease of explanation in FIG. 3, input signals to the switch are identified as 1 and 2 respectively, from top to bottom. With the switch in the first state (s=0), the output of the switch is 1 and 2, respectively, from top to bottom. That is, the input routes and the output routes are unchanged. On the other hand, when the switch is the second state (s=1), the output of the switch is now 2 and 1, respectively, from top to bottom. That is, the input routes and the output routes are effective swapped.

It may be assumed that each signal experiences a fixed insertion loss independent of the state of the switch. The combined state of all switches in the switch network is referred to as the network state. Given a particular network state, a photon entering a switch network input will emerge (unless lost through attenuation) at a particular switch network output. This input/output relationship is one-to-one for each network state, and so that each network state produces some permutation of the input at the output.

The number of optical switches and their specific interconnection, or configuration, are design parameters and will vary depending of the specific switching reconfigurable switch network 220 architecture employed.

Reconfigurable and Scalable Quantum Network Configurations

To describe switch network configuration designs, graphical depictions are often employed. Each switch is depicted by a rectangle and possible photon routes are depicted by lines, where photons are assumed to travel from left to right and intersecting lines do not imply a connection except at switch ports (i.e., when lines intersect at a rectangle). The lines external to the switches describe how the switches are interconnected, whereas lines within a switch depict the possible routing of photons depending on the switch state. Specifically, parallel lines depict the routing of photons when the switch is off and crossed lines depict the routing of photons when the switch is on. (The lines within the switches are omitted elsewhere herein for clarity of presentation.) The switch network inputs are represented by disconnected lines on the left, and, w.l.o.g., an assumption is made that these inputs are numbered (from I) sequentially from top to bottom. The correspondence between the photon-source outputs K and network inputs I is then given by labeling the ends of these disconnected lines with the appropriate photon labels. Similarly, the switch network outputs are given by disconnected lines on the right and, w.l.o.g., are assumed to be numbered (from O) sequentially from top to bottom. As noted in herein, it can be assumed that the network outputs O and users U are in direct correspondence, as depicted with the user labels on the ends of the disconnected lines on the right.

The network configuration is independent of the state of the network, but it will be notationally convenient to consider how photons are routed when the network is in the all-zero state (i.e., when all switches are off). Essentially, the connectivity of a given switch input port is defined in terms of the input from which photons arriving at that port originate when the network is in the all-zero state. For example, the top port of switch S3 in FIG. 2 receives photons from switch network input 0 (for instance, corresponding to photon +1) when the network is in the all-zero state, whereas the bottom port of switch S3 in FIG. 2 receives photons from switch network input 2 (for instance, corresponding to photon +2) when the switch network is in the all-zero state. These values may be combined for the input ports of the given switch into a pair, for example, the pair (0, 2) for switch S3 in FIG. 2. Note that the order in which these values are listed in the pair is immaterial, as the description will remain consistent if reversed.

Embodiments of the present invention leverage various traditional telecommunication switching network designs for the reconfigurable switch network 220 architecture. These traditional telecommunication switching network designs have regular constructions of switching component making them scalable, especially for arbitrarily large networks (e.g., N>>10). These networks largely fall into two general types: Beneš-type and banyan-type networks, as further explained. Such regular constructions generally require that $N=2^n$ for $n \in \mathbb{N}$. Accommodating general $N \neq 2^n$ appears nontrivial, although in that case one can employ an $\tilde{N} \times \tilde{N}$ network with $\tilde{N}=2^n>N$, leaving the additional $\tilde{N}-N$ dummy users disconnected. (Arbitrary pairing requests between dummy users can be employed if required by an associated routing algorithm.) The downside of this approach is that $\tilde{N}/2$ sources of entangled photon pairs are generally required regardless of the precise value of N. In any case, an assumption is usually made that $N=2^n$.

To implement and operate a switching network, one requires both the network structure as well as a method to determine network states that satisfy entanglement requests by network users. Since the set of network states grows exponentially in the number of component switches, it is not practical with large networks for one to precompute the entanglement request that is satisfied by every state. Instead, one requires an online routing algorithm that, given an entanglement request, can efficiently produce a network state satisfying that request. As such, the present invention relates not only to identifying scalable designs of feasible networks, but also corresponding scalable routing algorithms.

Beneš Networks

A Beneš network is a conventional rearrangeable non-blocking network capable of producing any permutation of the input at the output as reported in W. Kabacinski, "Nonblocking Electronic and Photonic Switching Fabrics." New York: Springer, 2005, herein incorporated by reference in its entirety.

A Beneš type network is a N×N network having 2 $\log_2$ N−1 stages of N/2 switches each. The total number of switches thus is N log 2 N−N/2. Since the requirements of an entanglement distribution network are less restrictive than these conventional uses, it is clear then that an N×N Beneš network is feasible, regardless of the connection of photon-source outputs to network inputs. Given an entanglement request, specific photon labels $k \in K$ can be selected arbitrarily (or as an option provided to the users) to satisfy the entanglement request.

Figure 4:
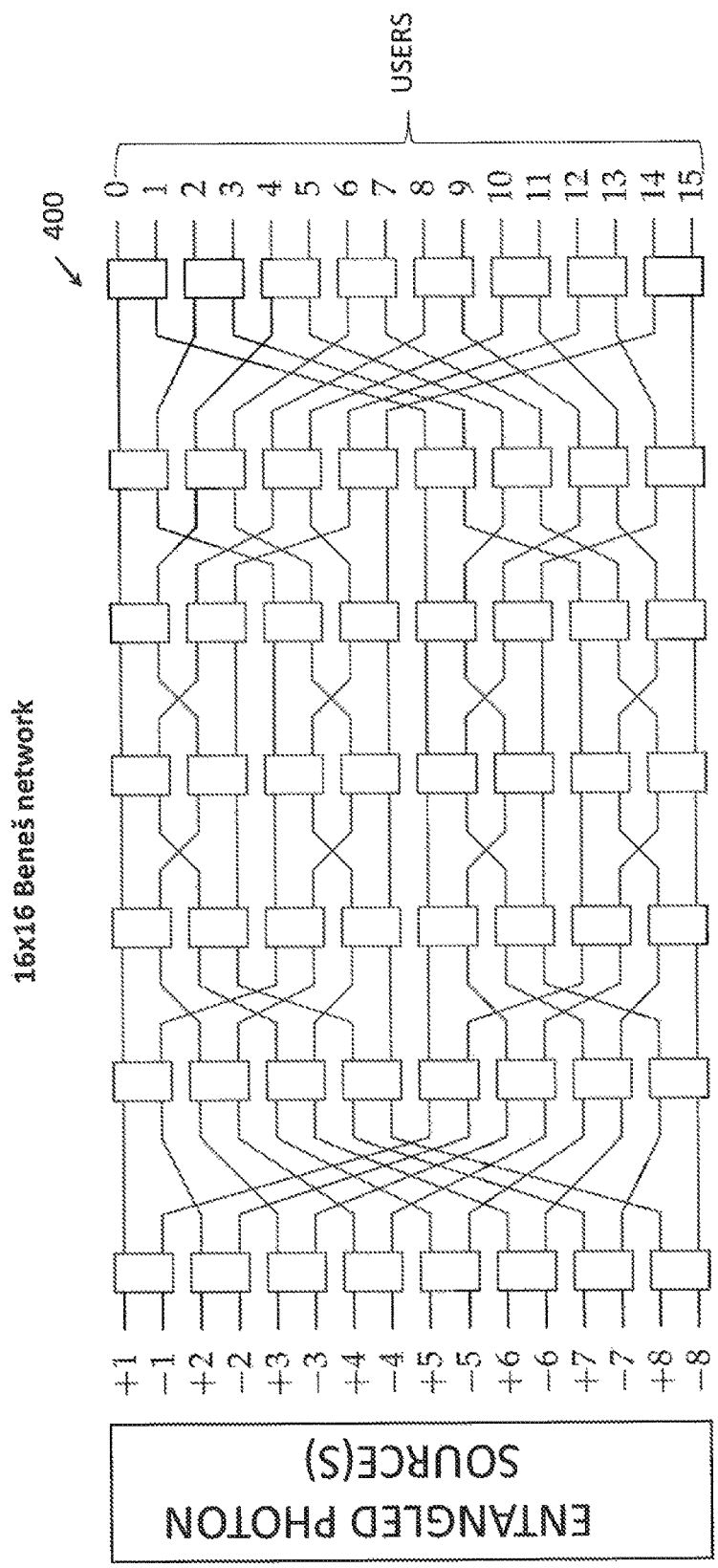
FIG. 4 is a schematic illustration of a Beneš network used as a reconfigurable switch network according to embodiments of the present invention.

FIG. 4 is a schematic illustration of a Beneš network 400 for use as the reconfigurable switch network 230 (FIG. 2) according to an embodiment of the present invention. It received quantum entangles pairs from source 210 and selectively routes individual ones of said entangled pairs simultaneously to the outputs. The recursive and repeatable structure of the Beneš network 400 can be readily deduced from FIG. 4, which depicts a 16×16 Beneš network, in particular. The Beneš network 400 is composed of 7 stages, each containing 8 2×2 crossbar switches, for a total of 56 2×2 switches.

The states of the individual switches of the Beneš network 400 can be set by control signals 235 generated by the control module 230 (FIG. 2) using a looping algorithm method 500, as further discussed below with respect to FIG. 5.

In all embodiments, the function of the control module 230 is to take as input an entanglement request and output a network state that results in the system producing entangled photon pairs according to that request. A component of this function is the determination of which pair of photons will be routed to each pair of users specified by the entanglement request.

In the case of the embodiments employing the Beneš networks, this determination can be made explicitly prior to considering the states of any of the network switches. Doing so results in a simplified algorithm for setting the states of the network switches and allows one to leverage a so-called "Looping Algorithm."

Figure 5:
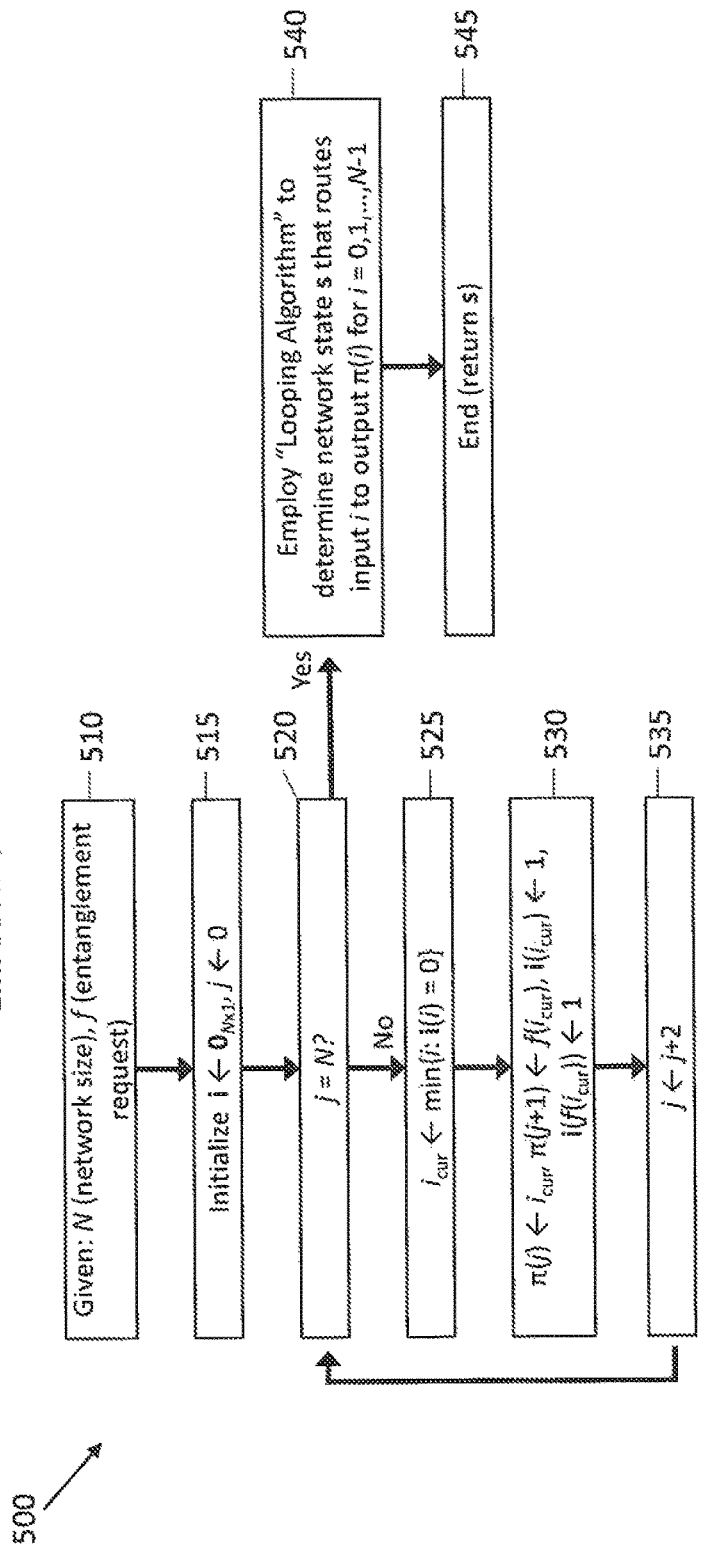
FIG. 5 shows a block diagram of a general routing algorithm method for a reconfigurable Beneš switch network according to embodiments of the present invention.

FIG. 5 shows a block diagram of a routing algorithm method 500 for the Beneš network 400 according to embodiments of the present invention. The method 500 executes a routing algorithm that finds which switches to set to the "on" state and which ones to set to the "off" state for a particular request for routing entangled particles in response to an entanglement request.

The method 500 begins in step 510 by establishing the parameters of the algorithm. An N×N Beneš network comprises $2 \log_2 N - 1$ stages or columns of N/2 switches each. The total number of switches thus is $N \log_2 N - N/2$.

Hence, the setting of N can be performed initially when setting up a particular Beneš network. The entanglement request f, on the other hand, is determined from the classical communication signals from the neighboring quantum-network nodes and is therefore the input that indicates the desired mode of operation for the entanglement-distribution switching network at a given time.

For a given N×N Beneš network, we label the input ports, and separately the output ports, of the Beneš network sequentially from 0 to N−1. This implies that photons with label +i and −i are introduced into network inputs $2(i-1)$ and $2i-1$, respectively.

In steps 515-535, a mapping from the Beneš-network inputs to the Beneš-network outputs is established that conforms to the entanglement request f. In particular, note that f indicates which pairs of outputs are to receive entangled-photon pairs, but not specifically which pair of entangled photons each of those output pairs are to receive. Steps 515-535 establish which output pair will receive entangled photon pair +/−1, which output pair will receive entangled photon pair +/−2, and so forth. The mapping that is determined is represented by the function π, which, once determined, indicates that, for each i, $0 \leq i < N$, photons introduced to the Beneš-network input i are to be routed through the Beneš-network to Beneš-network output π(i).

In step 515, a length-N vector i of binary variables is initialized to the all-zero vector, while a counter j is initialized to 0. The ith element of vector i indicates whether or not the algorithm has yet to determine which Beneš-network input will be routed the ith Beneš-network output. Meanwhile, counter j indicates which Beneš-network input pair (j and j+1) that the algorithm is in the process of determining to which Beneš-network output the pair will be routed. Continuing to step 520, a determination is made whether the j counter has reached N, corresponding to having completed the determination of to which Beneš-network output each of the Beneš-network inputs will be routed. If the answer is "no" then the method proceeds to step 525 for further processing. On the other hand, if the answer is "yes" then the method goes to step 540.

In step 525, a Beneš-network output that has not been assigned a corresponding Beneš-network input is determined. The label of this Beneš-network output is stored in variable $i_{cur}$. In this embodiment, the minimum of such labels of unassigned outputs is taken, mathematically written $i_{cur} \leftarrow \min\{i: i(i)=0\}$.

Next in step 530, we make the assignment that Beneš-network input j is to be routed to Beneš-network output $i_{cur}$, represented mathematically as $\pi(j) \leftarrow i_{cur}$. Similarly, we make the assignment that Beneš-network input j+1 is to be routed to Beneš-network output $f(i_{cur})$, represented mathematically as $n(j+1) \leftarrow f(i_{cur})$. This dictates that the users connected to output pairs $i_{cur}$ and $f(i_{cur})$ are to receive the entangled photon pairs introduced to Beneš-network inputs j and j+1, thus satisfying the entanglement request f. Finally, the elements of the indicator vector i are updated to reflect that Beneš-network outputs $i_{cur}$ and $f(i_{cur})$ have been assigned to a Beneš-network input, mathematically written $i(i_{cur}) \leftarrow 1, i(f(i_{cur})) \leftarrow 1$. In step 535, the j counter is advanced to the next unassigned Beneš-network input. Since each loop processes a pair of Beneš-network inputs, this requires that we advance the counter by 2, mathematically written $j \leftarrow j+2$. Afterward, the processing returns to step 520 for additional iterations, if any.

Following the "yes" determination in step 520, the processing goes to step 540. Here, a well-known "looping algorithm" for a Beneš network may be applied, for instance like the one described in the published paper by D. C. Opferman and N. T. Tsao-Wu, "On a class of rearrangeable switching networks: Part I: Control algorithm," The Bell System Technical Journal, vol. 50, May-June 1971, herein incorporated by reference in its entirety.

Regardless of the looping algorithm relied upon, it is used to determine network state vector s that routes input i to output π(i) for i 0, 1, . . . , N−1. The states are set such that for each and every input i=0, 1, . . . , N−1, the photons introduced at that input (e.g., input i) will be routed to the output determined by π (e.g., π(i)). The processing ends in step 545, the result of which is to return the state vector s corresponding the states of switches in the network to achieve routing of entangled particles pairs between and amongst the users in response an entanglement request.

Reduced Beneš Network

An immediate improvement to the parameters of the Beneš network can be realized by noting that when the inputs to each of the switches in the first stage are initially chosen to be entangled pairs (such as in FIG. 5), then the switches in the first stage are superfluous and can be removed, replaced with permanent connections replicating the "off" state of the switch. The resulting network is referred to herein as a "reduced Beneš network."

No significant change is required to the routing algorithm method 500. Indeed, the method 500 can proceed is if the first stage of switches were present, but the resulting switch states that are produced by the algorithm for the first stage can simply be ignored. The resulting reduced Beneš network has $N \log_2 N - N$ switches.

Figure 6:
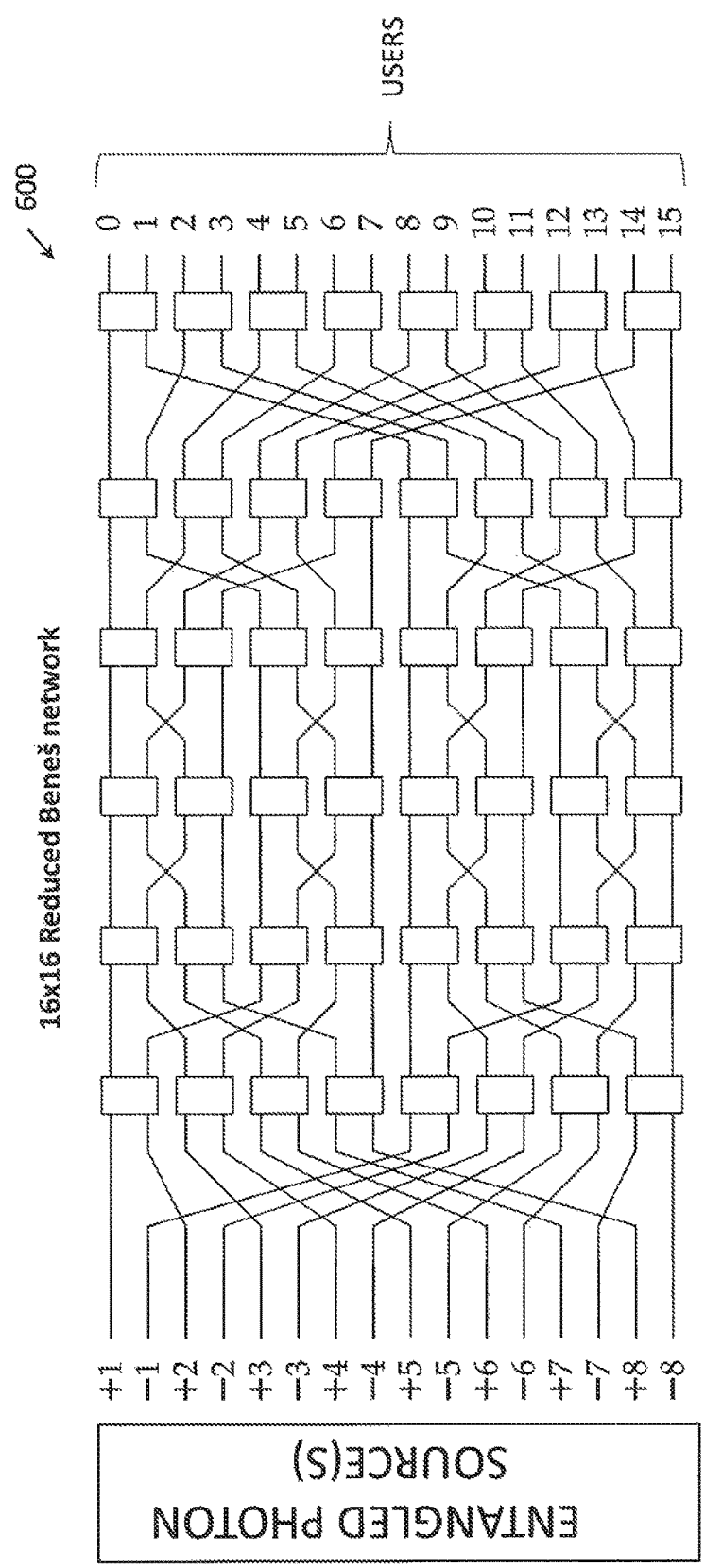
FIG. 6 is a schematic illustration of a reduced Beneš switch network according to embodiments of the present invention.

FIG. 6 is a schematic illustration of a reduced Beneš network 600 which can be used as the reconfigurable switch network 230 (FIG. 2) according to another embodiment of the present invention. The Beneš network 400 and the reduced Beneš network 600 and both 16×16, but the former has 56 switches whereas the latter had 48 switches.

Banyan-Type Networks

Next, embodiments of present invention encompasses a related class of networks, that of N×N banyan-type networks, which comprise $\log_2 N$ stages, each with N/2 switches, for a total of $N/2 \log_2 N$ switches, configured in particular recursive tree-like structures are discussed. It may be implemented by interconnecting 2×2 switching networks in multiple and recursive stages.

Banyan-type networks for conventional telecommunication have been generally described by Kabacinski, Nonblocking Electronic and Photonic Switching Fabrics. New York: Springer, 2005, here incorporated by reference in its entirety. Although there are several varieties of banyan-type networks, such as the banyan, baseline, and omega networks, they are all essentially functionally equivalent, requiring only the intrastage reordering of switches (without breaking connections) to convert between them.

The N×N banyan-type networks are not rearrangeable nonblocking (except in the trivial case of N=2) when used as a conventional switching fabric that attempts to produce any permutation of the input at the output. However, by developing a routing algorithm, it will be shown that banyan-type networks are feasible pairwise-entanglement distribution networks if entangled photon pairs are appropriately routed to the switch network inputs. In the case of the omega networks, one such appropriate routing of entangled photon pairs to the switch network input, which is considered in the embodiments discussed here, requires that entangled photon pairs be routed to adjacent switch network inputs. A corresponding routing for a banyan-type network other than an omega network is easily obtained by considering the intrastage reordering of the switches that converts between the omega network and the banyan-type network of interest.

Embodiments employing the banyan-type and reduced-banyan-type networks for the reconfigurable switch network 220 use a routing algorithm that simultaneously determine the network switch states and which pair of entangled photon sources will be routed to each pair of users. This results in a higher complexity algorithm, and in fact it is not obvious a priori that such an algorithm exists with reasonable (scalable) computational complexity. In fact, it is not clear a priori that such an algorithm exists with any level of computational complexity. A key novel element of the embodiments employing the banyan-type and reduced-banyan-type networks is the specification of a control module that implements a routing algorithm with computational complexity that is linear in the number of switches that compose the switching network.

Figure 7A:
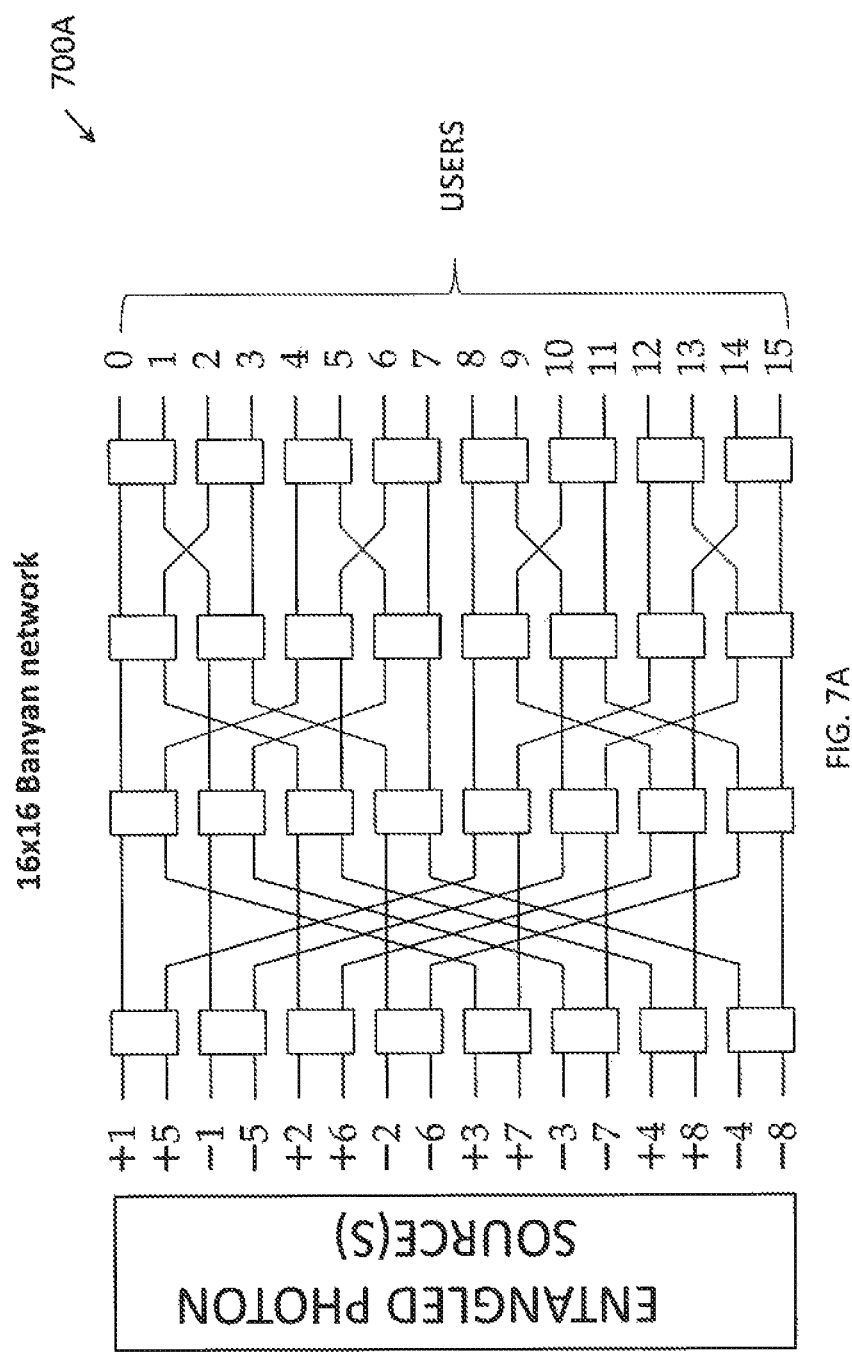
FIGS. 7A, 7B and 7C show a reconfigurable banyan switch network, reconfigurable baseline switch network, and a reconfigurable omega switch network, respectively, according to embodiments of the present invention.
Figure 7B:
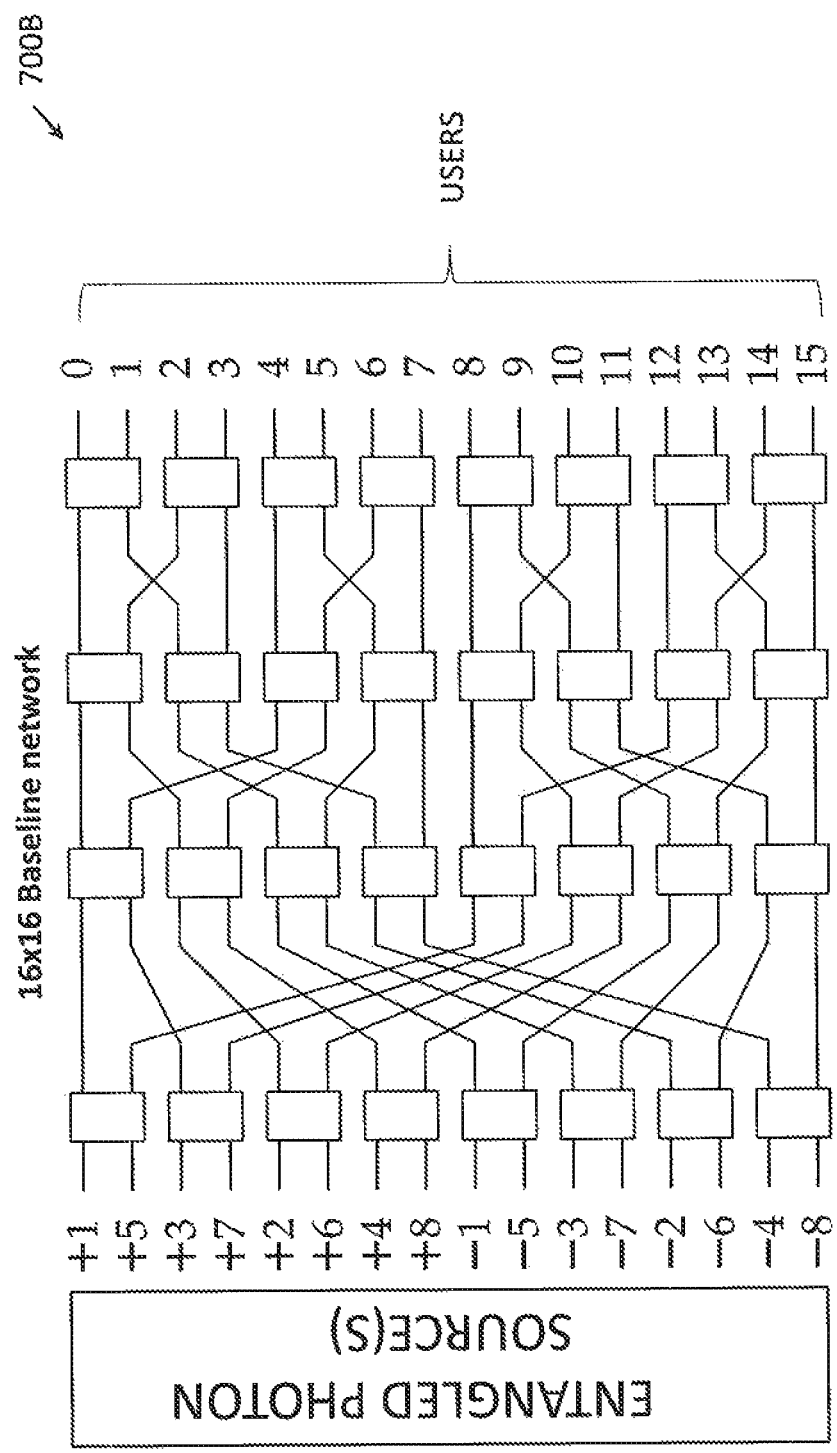
Figure 7C:
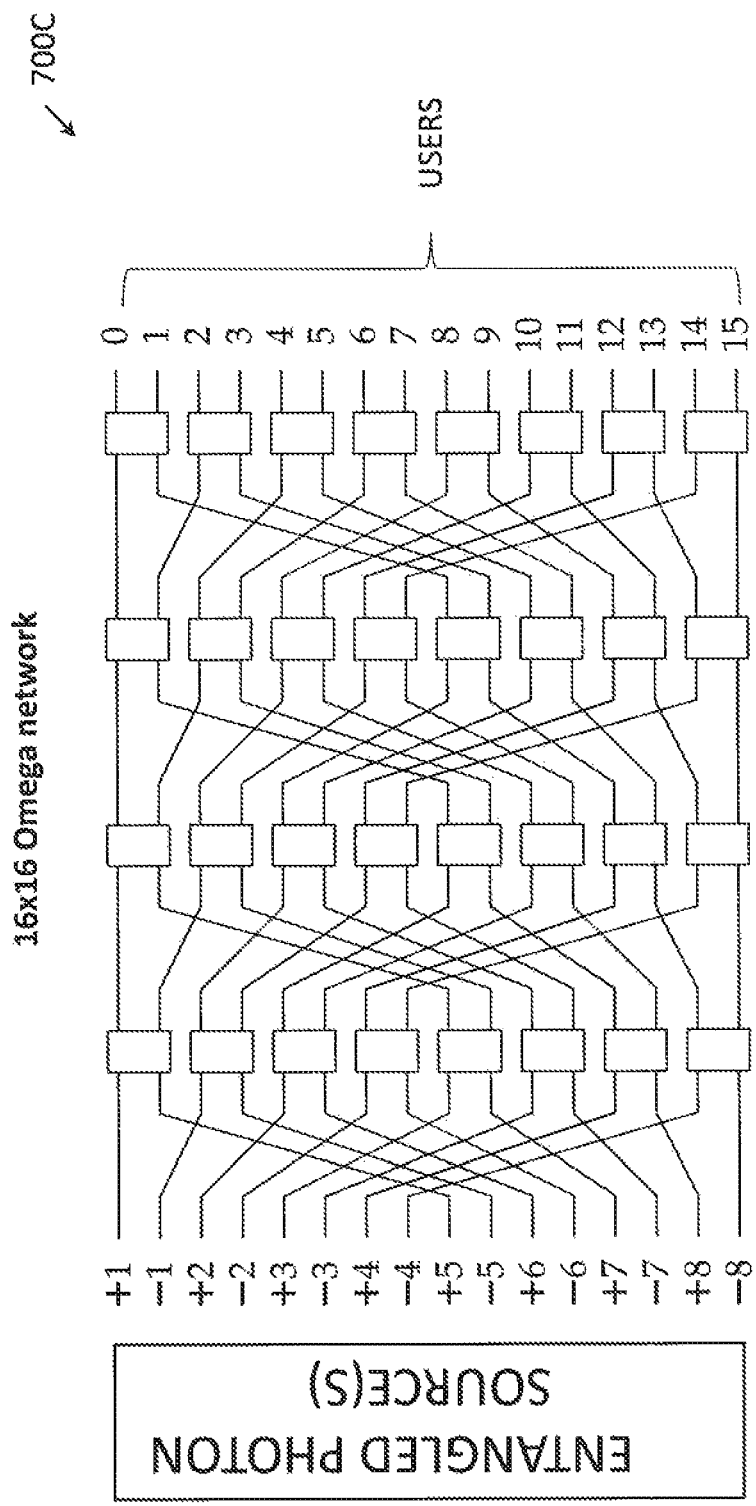

FIGS. 7A, 7B and 7C show a banyan network 700A, Baseline network 700B, and omega network 700C, respectively. In each of these cases, the networks depicted are 16×16. Thus, each have 32 switches.

Network configurations include the mapping between photon-source outputs and network inputs, since proper operation of the network generally depends on the photons input to the network having particular entanglement pairings and selectively routing the pairs to respectively output ports of the switching network. Photon pairs must be introduced in an appropriate manner for successful operation. (The mapping from pairs to inputs is not unique, but if done incorrectly, the network cannot function.) Essentially, the labeling for the omega network 700C correspond to the routing algorithm method 800 (FIG. 8) which was designed to work with that labeling. The other banyan-type networks 700A, 700B are merely redrawings of each other, obtained by vertically moving around the switches in each column without breaking the intercolumn connections. Such vertical movement of switches implies that the input wires that have been labeled also get shuffled in the redrawing. Hence, the photon labels in 700A and 700B were obtained by starting with the omega network and performing the shuffling that achieves the alternative banyan-type network.

Figure 8:
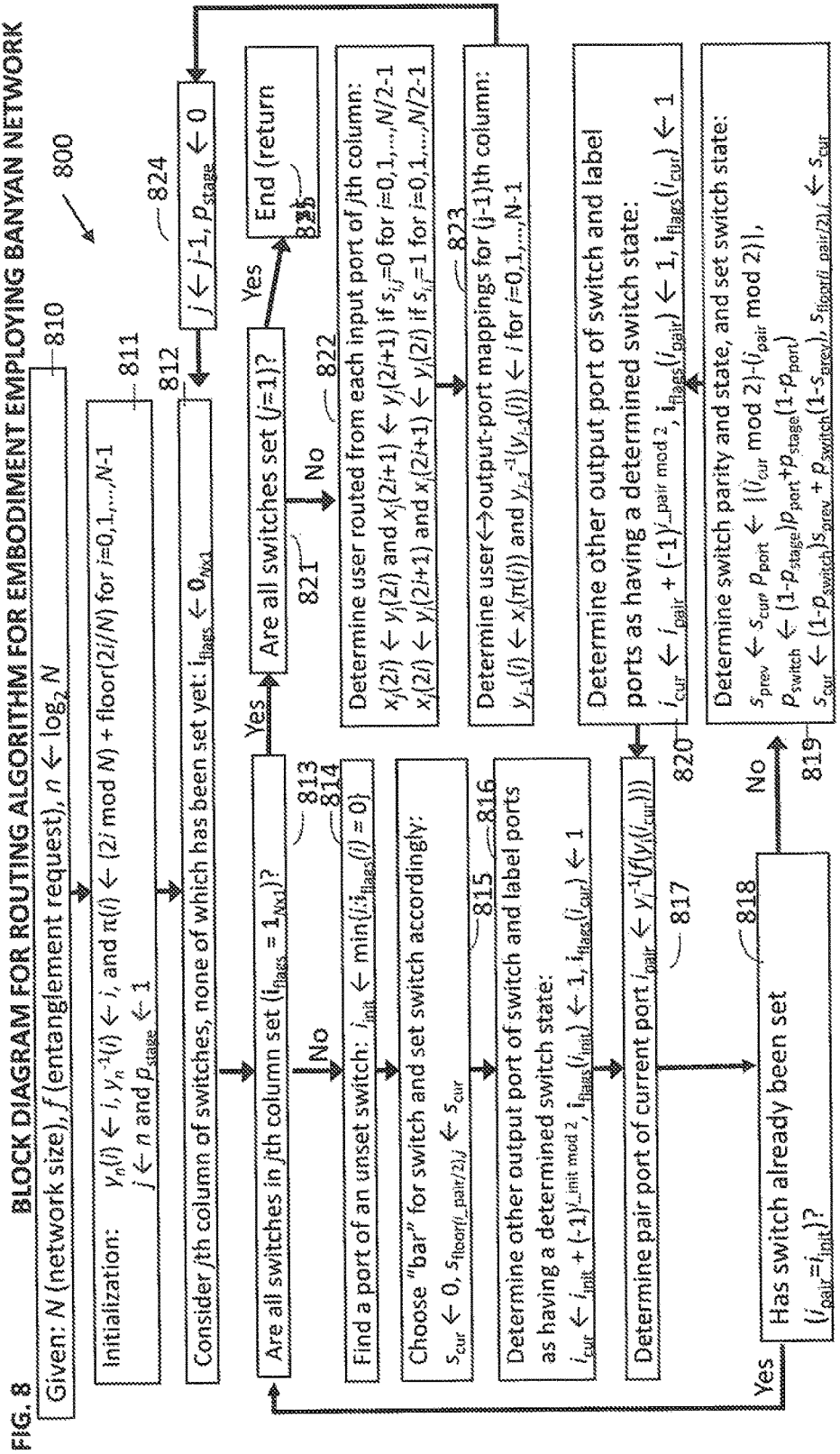
FIG. 8 shows a block diagram of a general routing algorithm method for a reconfigurable banyan-type switch network according to embodiments of the present invention.

FIG. 8 shows a block diagram of a general routing algorithm method 800 for the banyan-type networks according to embodiments of the present invention. Routing algorithm method 800 is specific for the particular case of the omega network. The structure of the interconnections between columns of switches is the same throughout an omega network, thus simplifying this algorithmic description. However, with some modifications, the routing algorithm of FIG. 8 can apply to any of banyan-type network embodiments with an appropriate mapping of photons. The algorithm sequentially considers each column of switches, from the nth column to the first column, setting the state of the switches in the column at hand to be consistent with the entanglement request and the previously set switches.

In step 810, the network size parameters have been established and an entanglement request f is received. Here, the output ports (and separately the input ports) of the switches in each column are numbered sequentially from 0 to N−1, so that for any particular column, the top and bottom ports of the ith switch, $0 \le i < N/2$, are numbered 2i and 2i+1, respectively. Recall, for banyan-type networks, $N=2^n$; thus $n \leftarrow \log_2 N$. We label the stages, or columns, of the omega network sequentially from 1 to n.

Next, in step 811, various parameters are initialized which are used by the algorithm. The algorithmic variable $y_j(i) \in U$, with $0 \le i < N$ and $1 \le j \le n$, is the user to which the ith port of the jth column is routed by the algorithm. The values of the $y_j(i)$ for the jth column are determined during a corresponding pass through the algorithmic loop comprising steps 812 through 824, except for the initialization of the nth column (performed in step 811), for which $y_n(i)=i$ for all i. We also define variables $y_j^{-1}(i)$ that equal the output-port number in the jth column of the network that is routed to user i, so that in step 811 we initialize $y_n^{-1}(i)=i$. As the notation implies, we will always have that $y_j^{-1}(y_j(i))=i$, i.e., these variables define inverse mappings. We emphasize that the notation $y_j^{-1}(i)$ in FIG. 8 refers to an algorithmic variable (indexed by i and j) and not to an operation (e.g., $1/y_j(i)$) to be performed on variable $y_j(i)$.

Also initialized in step 811 is the permutation, or function, $\pi(i)$, which indicates how the output ports of the switches of one column of the omega network are connected to the input ports of the switches of the next column of the omega network. In particular, the output port numbered i in one column is connected to the input port numbered $\pi(i)$ in the next column. The counter variable j considers the column of switches that are being set by the algorithm at a given time. The algorithm sequentially (in reverse) considers each column of switches, from the nth column to the first column, setting the state of the switches in the column at hand to be consistent with the entanglement request and the previously set switches. Hence, step 811 initializes j to the value n. Finally, a variable $p_{stage}$, the purpose of which will be described later, is initialized to 1.

When the algorithm considers setting the switches in the jth column for the first time, a length-N vector $i_{flags}$ of binary variables is set to the all-zero vector in step 812. The elements of this vector indicate whether or not the output port in column j with label equal to the index of the vector element belongs to a switch whose state has been previously set by the algorithm. When all switches in stage j are set, vector $i_{flags}$ will be the all-one vector. Step 813 determines whether this is the case; if so, the algorithm proceeds to step 821, whereas if this is not the case, the algorithm proceeds to step 814 for further processing of the jth column of switches.

Now, for explanatory purposes, we briefly focus on the process by which the nth column of switches is set. By the network construction, we note that the labels of photons received by one user of $y_n(2i)$ and $y_n(2i+1)$ will have positive sign and the labels of photons received by the other user will have negative sign. Now, starting with port 0 (an arbitrary choice) of the nth column, we assign state 0 (another arbitrary choice) to the corresponding switch. This determines that user $y_n(0)$ and $y_n(1)$ will receive photons with positive and negative labels, respectively. That is, $g(y_n(0))>0$ and $g(y_n(1))<0$, where g: U→K is the mapping of user labels to photon labels, corresponding specifically to the state that is output by the algorithm. Since user $y_n(1)$ can now be assigned only negative photon labels, it follows that the partner, i.e., the user $f(y(1))$ that is to receive photons that are entangled with those sent to user $y_n(1)$, must be assigned a positive photon label. The port corresponding to this partner is $y_n^{-1}(f(y_n(1)))$. Depending on whether this is the top or bottom port of the corresponding switch (or, equivalently, whether $y_n^{-1}(f(y_n(1)))$ is even or odd), it follows that the switch must have state 0 or 1, respectively. We can then consider the other port of that switch and perform a similar analysis.

More generally, we note that the top (bottom) input port of every switch in the nth column can only receive photons with positive (negative) labels. Thus, if a user u and its partner f(u) are both routed from top or bottom output ports (a condition that is notated by $p_{port}=0$ in FIG. 8), then the corresponding switches must be in opposite states (a condition that is notated by $p_{switch}=1$ in FIG. 8). On the other hand, if one of u and f(u) is routed to a top port and the other is routed to a bottom port (i.e., $p_{port}=1$), then the corresponding switches must be in the same state (i.e., $p_{switch}=0$). We apply these observations to the cycle of switches obtained by alternatingly considering the output port that is on the same switch as the current port and the output port associated with the partner of the user routed to the current port. This cycle terminates when we arrive back at the initial port being considered.

The switch states along this cycle alternate as many times as the associated entanglement partners are routed both from top or both from bottom output ports. But since the cycle terminates when we arrive back at the initial port, there must be an even number of such cases. Hence, the implied state of the switch at the end of the cycle must be the same as that which was originally assigned, and no contradiction will be encountered. If all switches in the nth column have been assigned states, we proceed to the (n−1)th column, as discussed below. However, if a switch has not been assigned a state, we select one such switch arbitrarily and repeat the process. Clearly, this second cycle of switches must be disjoint from the first, and so again the procedure cannot lead to a contradiction. In any case, we continue assigning states to cycles of switches until all switches in the nth column have been assigned states.

Relating the previous description specifically to FIG. 8, step 814 determines the label of an output port of a switch in the jth column that has yet to be set. This label is stored in variable $i_{init}$. This initiates the aforementioned cycle of switches, and the step 815 sets the state of the corresponding switch arbitrarily to the bar state. In particular, the switch state is permanently stored in $s_{floor(i\_pair/2),j}$, which is the element of the vector s of switch states corresponding to the switch at hand. Note that throughout, an underscore in a variable name indicates that the term following the underscore should be read as a subscript; hence, i_pair is equivalent to $i_{pair}$. In addition, the switch state is also stored in a temporary algorithmic variable $s_{cur}$ to be used in later processing.

The next switch in the previously described cycle of switches is determined in steps 816 and 817. Recall that the cycle is formed by alternatingly considering the output port that is on the same switch as the current port and the output port associated with the partner of the user routed to the current port. Step 816 determines the output port i that is on the same switch as the current port when considering the first switch in a cycle. (This determination is made in step 820 thereafter, as will be discussed later.) In addition, the appropriate elements of the vector $i_{flag}$ is updated to reflect that the switch with output ports $i_{cur}$ and $i_{init}$ has been set. Step 817 then determines the output port associated with the partner of the user routed to output port $i_{cur}$, setting $i_{pair}$ to this port.

The determination of whether the previously described cycle of switches is complete is made in step 818. If so, the algorithm proceeds to step 813 to determine whether additional cycles must be considered for the current column of switches. If step 818 determines that the current cycle of switches is not complete, the algorithm proceeds to step 819 to consider the next switch in the cycle.

If the algorithm enters step 819, then $i_{pair}$ is the output port of a switch in the jth column that has not been set. According to the previous description, step 819 determines the state to which this switch must be set in order to enable entangled pair routing through the networks consistent with the entanglement request and the previously set switches. This state is temporarily stored in the variable $s_{cur}$ and permanently stored in the variable $s_{floor(i\_pair/2),j}$. Intermediate computations are stored in temporary variables $s_{prev}$, $p_{port}$, and $p_{switch}$, where $s_{prev}$ is simply the state of the previously considered switch and $p_{port}$ and $p_{switch}$ were previously described.

Having set the current switch state, that algorithm proceeds to determine the next switch in the aforementioned cycle. This is analogous to the previously described operation of 816 and 817. Here the task is performed in steps 820 and 817, the difference being that step 816 considered only the output port for the first switch in the cycle (i.e., $i_{init}$), while step 820 considers the output port $i_{pair}$ of the switch under current consideration. Having performed step 817 again, the algorithm continues the loop, proceeding again to step 818.

As previously noted, the algorithm returns from step 818 to step 813 when a cycle of switches in the jth column is complete, and then proceeds to step 821 when there are no more switches (and, hence, no more cycles of switches) in the jth column to consider. If j=1, then every switch has been set, and the algorithm can terminate by proceeding to step 825, which returns the network state s. If j>1, then there are more columns of switches that need to be set, and the algorithm proceeds to step 822 for further processing.

Now, given the $y_j(i)$, $0 \leq i < N$, and the switch states $s_{i,j}$, $0 \leq i < N/2$, we can determine the users to which output ports of the (j−1)th column of switches are routed. In particular, we first determine the users $x_j(i) \in U$, $0 \leq i < N$, to which the input ports of the nth column of switches are routed by replicating the $y_n(i)$, except that we swap the values of $y_n(2i)$ and $y_n(2i+1)$ whenever $s_{i,n}=1$. In FIG. 8, the $x_j(i)$ are computed in step 822. We then enforce the structure of the omega network to permute the $x_j(i)$ according to the inter-column connections to obtain the $y_{j-1}(i)$, $0 \leq i < N$. In FIG. 8, this is performed in step 823 using the permutation π.

In step 824, the counter variable j, indicating the column of switches under current consideration, is decremented. In addition, the variable $p_{stage}$ is updated as well. This variable first appeared in step 819 and alters the process for setting switch states for the nth column versus all other columns. The initial value of 1 for $p_{stage}$ is consistent with the previous discussion regarding the setting of switch states in the nth column. The process of assigning states to cycles of switches in the remaining columns is nearly identical, but with one essential difference. For the nth column, we required photons with labels of opposite signs to be routed to entanglement partners, which required that entanglement partners be routed from opposite (top/bottom) inputs ports of their respective switches. That is, if one user was assigned to the subset of photon labels $\{+1, +2, \ldots, +N/2\}$ from the top input port of some nth-column switch, then its partner would be assigned to the subset of photon labels $\{-1, -2, \ldots, -N/2\}$ from the bottom input port of some nth-column switch. For all other columns of switches, however, the goal is instead to route photons to each user and partner from the same (top or bottom) input port of the respective switches. Doing so ensures that the photons that can be routed to the entanglement partners will have labels of the same magnitude (but opposite sign).

For example, users assigned to positive photon labels (as determined by the assigned states of the nth column of switches) have been routed to switches in the (n−1)th column that can have photons with labels in $\{+1, +3, \ldots, +(N/2-1)\}$ routed to the top input port and photons with labels in $\{+2, +4, \ldots, +N/2\}$ routed to the bottom input port. Similarly, the partners of those users (which must have been assigned negative photon labels) have been routed to switches in the (n−1)th column that can have photons with labels in $\{-1, -3, \ldots, -(N/2-1)\}$ and in $\{-2, -4, \ldots, -N/2\}$ routed to the top and bottom input ports, respectively. Hence, we must set the associated switches so that the entanglement partners are either assigned photon-label subsets $\{+1, +3, \ldots, +(N/2-1)\}$ and $\{-1, -3, \ldots, -(N/2-1)\}$ (top input ports) or photon-label subsets $\{+2, +4, \ldots, +N/2\}$ and $\{-2, -4, \ldots, -N/2\}$ (bottom input ports).

In FIG. 8, we enforce this change of parity in the desired routing from input ports by initializing the variable $p_{stage}=1$ in step 811 (when considering the nth column) of switches and setting $p_{stage}=0$ otherwise (in step 824). This variable is then used in step 819 to determine the value of $p_{switch}$, which, as before, encodes whether the switches routed to given entanglement partners should be in the same or different states. With this adjustment, the procedure for assigning states to switches in all columns j<n is then identical to that for column n. That is, the algorithm reenters the loop comprising steps 813-820 to set the states of the switches in column j.

By similar reasoning employed for switch column n, no contradiction can be encountered in the state assignments for the other columns, and, by construction, photons with labels of the same magnitude but opposite sign will be routed to switch input ports in the j=1 column that are, in turn, routed to entanglement partners. Hence, the resulting set of states will satisfy f. Also, because the algorithm visits each switch once and the assignment of the state to each switch requires O(1) computations, it is clear that the overall algorithm requires O(m), or O(N log$_2$ N), computations. The banyan-type networks are most efficient when $N=2^n$. (Otherwise, as previously noted, a larger network with dummy users can be employed, but this requires excess sources of entangled photon pairs.).

It is noted that the Drost et al. (2016) article, mentioned above, which was incorporated in and formed the basis of the '236 provisional patent application, includes software code instructions (see FIG. 7 thereof) for a similar routing algorithm method for an omega network according to one embodiment of the present invention. Although the routing algorithm method 800 is specifically for embodiments employing the omega network (which is one of several banyan-type networks), it is apparent that the algorithm applies to any banyan-type network after simple modifications to steps 811 and 823.

Reduced Banyan-Type Network

Somewhat analogous to the reduced Beneš network embodiments, the banyan-type networks (700A, 700B, 700C) can similarly be operated in which a switch of each column is permanently set to, for example, state 0. As such, these switches can then be removed from the network, replaced by permanent connections replicating the "off" state of the switch. For simplicity, the removed switches may be the top switches in each column of the switch network, but could also be another switch in each column being removed, in other similar configurations. The resulting network is referred to herein as a "reduced banyan-type network." The number of switches needed in the reduced N×N banyan-type network is (N/2−1)log$_2$ N. The routing algorithm method 800 of FIG. 8 can be modified to accommodate the removal of any combination of switches with one switch from each column.

Figure 9:
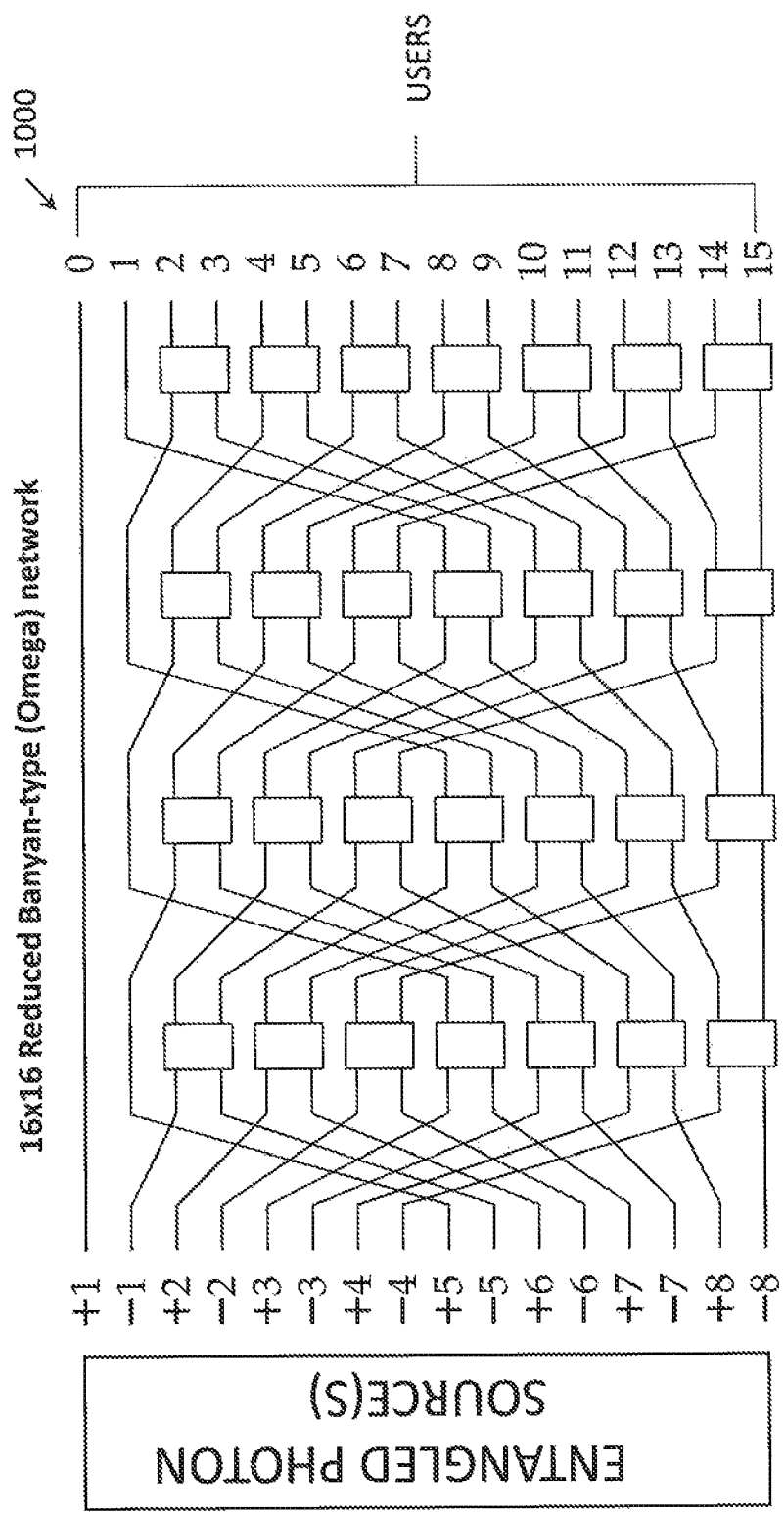
FIG. 9 shows a reduced banyan-type switch network according to embodiments of the present invention.

FIG. 9 shows a reduced banyan-type network 900 for use as the reconfigurable switch network 230 (FIG. 2) according to another embodiment of the present invention. Focus here is on the omega switching fabric for the case of N=16 (for which there are 28 switches), but this network architecture can similarly be adapted to the other banyan-type networks.

Comparison of '556 Application and Present Invention

Figure 10A:
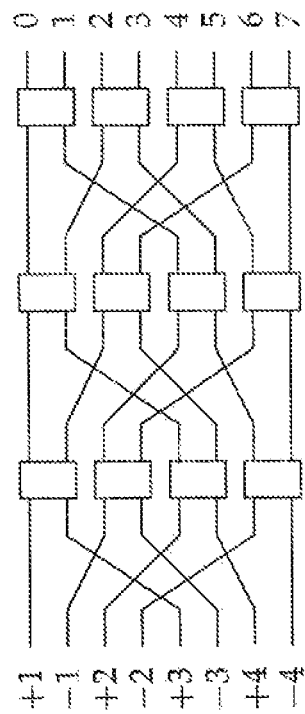
FIGS. 10A and 10B each show an 8×8 quantum switching network for comparison sake.
Figure 10B:
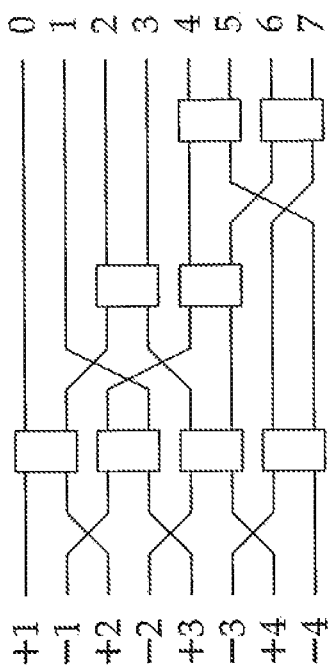

FIGS. 10A and 10B each show an 8×8 quantum switching network. FIG. 10A corresponds to the optimal 8×8 network system as was introduced in the aforementioned '556 patent application. It, along with the other networks disclosed in that prior patent application, were all created to have an irregular structure. The '556 patent application considered switching networks that are absolutely optimal in the sense that they must (i) utilize the minimum number of switches, and (ii) minimize a worst-case loss metric. A method was described in that application for determining an optimal network configuration to fulfil these requirements, and the application of this method yielded optimal designs for the cases of 6-, 8-, and 10-user networks. The associated routing algorithm involved a reverse lookup table, constructed by considering, in turn, each way in which the network switches could be set to determine and record the corresponding output pairings in, e.g., a table. Then, given a particular desired output pairing, the table is searched for that pairing to determine a network state that was in correspondence.

FIG. 10B is an 8×8 banyan-type network embodiment according to the present invention. It is based on the omega structure.

As an initial observation, both networks use a reconfigurable switching network (comprising interconnected photonic crossbar switches) as a component of a system that is to provide entangled photon pairs at the output of the system such that any configuration of pairings at the output can be provided upon request by setting the state of the switches in the switching network.

One key advantage of the present invention is its scalability with the use of switching networks with regular and repeating structure. As a result, it is possible to determine and describe the interconnection of very large networks using relatively simple descriptions that often recursively refer to smaller networks within the same family. This is in contrast to the '556 patent application which is an irregular network. Although in theory the algorithm described in the '556 patent application for determining switching network designs could be used for arbitrarily large networks (>>10), it is not truly a scalable method. For instance, as mentioned above, it is estimated that the design of a 16-user switching network using the algorithm of '556 patent application would require astronomical amounts of time to compute.

The present invention embodiment is directed to entanglement distribution systems that are applicable to more than a few users. In particular, in contrast with the prior '556 patent application that requires the careful design of the irregular interconnections between component switches to achieve absolute optimality, the present invention employs reconfigurable switching networks that are based on regular repeated structures. These repeated structures reduce the design complexity that fundamentally limits the applicability of the '556 patent application.

Furthermore, for a given switching network, the present invention embodiment associates a routing algorithm method that directly determines an appropriate network state given a particular set of output pairings, thus avoiding the use of a lookup table, the size of which again fundamentally limited the applicability of the previous patent application. The particular switching network employed provide the functionality necessary for an entanglement distribution along with the associated routing algorithm.

The tradeoff that is associated with employing a switching network is that, in general, we may no longer achieve an absolutely optimal switching network, neither with respect to the number of switches or with respect to the previously defined worst-case loss metric. However, the current invention is directed toward switching network designs and routing algorithms for which one can provide asymptotic statements, including in some cases a notion of asymptotic optimality, regarding the growth of these parameters, as well as the growth of the computational complexity of the associated routing algorithm. These asymptotic statements not only provide a description of these systems as having good characteristics, but are also the basis for the claim that these systems are applicable to very large networks.

Thus, one key benefit of the present invention embodiments are their scalability by using reconfigurable switching networks with regular and repeating structure. As a result, it is possible to determine and describe the interconnection of very large networks using relatively simple descriptions that often recursively refer to smaller networks within the same family.

The various reconfigurable switch network embodiments discussed herein can largely be divided into two types: Beneš-type network and banyan-type network. In particular, one needs a set of crossbar switches and a set of entangled photon sources; knowledge of how to connect the switches to themselves, the entangled photon sources, and the output ports of the invention; and how the control module is to function to set the switches based on the signals at the input ports of the invention. Various network designs have been disclosed including a Beneš network, a reduced Beneš network, a banyan-type network, and a reduced banyan-type network, for instance.

The banyan-type networks and reduced banyan-type networks can be further broken down into baseline, banyan, and omega architectures structures. These three structures are in a particular sense equivalent. In particular, the number of switches grows like N log N, the loss grows like log N, and the complexity grows like N log N. In fact, under a slightly more precise characterization of growth, the banyan-type designs are in fact optimal for all three quantities. This low complexity can be seen by the fact that there are regular repeating structures in the design, so that one can (relatively) easily describe how to make large networks simply by providing some simple instructions on how those structures repeat and are interconnected. In particular, these network structures belong to a family (largely) composed of regular repeating structure of opto-mechanical switches. They can be instantiated for any value of N inputs and N outputs (typically, a power of 2). The repeating structure enables scalability so as to form very large networks (N>>10). It does so with a number of subcomponents or switches (a proxy for size, power, and cost), performance (loss), and computational complexity (power and time) that is efficient, in the sense that as one considers larger and larger number of nodes N (N=4, 8, 16, 32, 64, 128, 256, 512, 1024, 2048, 4096, 8192, etc.), each of these quantities grows slowly in a mathematical sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. A quantum networking system for routing entangled photons pairs comprising:
one or more entangled photon sources which generate a plurality of entangled photon pairs;
a plurality N of optical output ports;
a reconfigurable switching network connecting to the one or more entangled photon sources and the plurality of optical output ports, which comprises a regular repeating structure of optical crossbar switches and their interconnections for selectively routing individual ones of entangled photons pairs that are input to the network from the one or more entangled photon sources to and amongst the output ports; and
a control module configured to:
receive a request for entangled photons at the optical output ports;
execute a routing algorithm to determine the state of the optical crossbar switches in the reconfigurable switching network to satisfy the request; and
generate and transmit electronic control signals to the reconfigurable switching network in order to set the states of the optical crossbar switches according to the executed routing algorithm.

2. The system of claim 1, wherein each of the optical crossbar switches has first and second inputs connected to adjacent interconnects feeding that switch and first and second outputs connected to adjacent interconnects exiting that switch, such that each switch is switchable between a first state in which the first switch input is connected to the first switch output and the second switch input is connected to the second switch output and a second state in which the first switch input is connected to the second switch output and the second switch input is connected to the first switch output.

3. The system of claim 1, wherein the one or more sources of entangled photon pairs output N/2 pairs of entangled photons for the N inputs to the network.

4. The system of claim 1, wherein the reconfigurable switching network comprises a N×N reconfigurable Beneš network formed of 2 $\log_2$ N–1 stages, each of N/2 switches, for a total of N $\log_2$ N–N/2 switches.

5. The system of claim 4, where the reconfigurable Beneš switching network comprises a reduced Beneš network in which the first stage of switches closest to the one or more entangled photon sources are removed and replaced with permanent connections replicating the "off" state of the switch such that there is a total of N $\log_2$ N–N switches.

6. The system of claim 4, wherein the control module executes a routing algorithm for the reconfigurable Beneš switching network comprising:
  sequentially defining a correspondence between photon labels and switch network outputs by repeatedly mapping the lowest unassigned positive photon label to the unassigned output with the lowest label, followed by mapping the corresponding negative photon label to the output that is to share entangled photon pairs with the previously determined output, and then repeating until all photon labels have been assigned, and
  performing a looping algorithm that for each photon label, routes the Beneš network input assigned to that photon label to the Beneš network output that is assigned to that photon label.

7. The system of claim 1, wherein the reconfigurable switching network comprises an N×N reconfigurable banyan-type network formed of $\log_2$ N stages, each with N/2 switches, for a total of N/2 $\log_2$ N switches.

8. The system of claim 7, wherein the banyan-type network comprises a reconfigurable banyan switch network, a reconfigurable baseline switch network, or a reconfigurable omega switch network.

9. The system of claim 7, where the reconfigurable banyan-type switching network comprises a reduced banyan network in which the one switch of each column of the network is removed and replaced by permanent connections replicating the "off" state of the switch such that there is a total of (N/2–1)$\log_2$ N switches.

10. The system of claim 7, wherein the control module executes a routing algorithm for the reconfigurable banyan-type switching network comprising:
  determining states of the switches in the $\log_2$ N stage of the banyan-type switching network, followed by the states of the switches in the ($\log_2$ N)–1 stage of the banyan-type switching network, followed by the states of the switches in the ($\log_2$ N)–2 stage of the banyan-type switching network, and so forth, until the switches in the first stage of the banyan-type switching network are set;
  for each stage of the banyan-type switching network, partitioning the switches into maximal disjoint cycles such that switches that are adjacent in a cycle have the property that, according to the already determined states of the switches in subsequent stages of the network, one output of each switch is routed to one of a pair of system optical output ports that, based on the communication signals received on the one or more communication input ports, are to transmit entangled photon pairs; and
  for each of the determined maximal disjoint cycles, determining states of the switches in the order that the switches appear in the cycle, setting the first switch of the cycle arbitrarily to either the cross state or the bar state, and then setting subsequent switch states so as to not prevent, according to the already determined states of the switches in subsequent stages of the network and the already determined states of the previously considered switches in the cycle, entangled photon pairs from being output on system optical output ports that, based on the communication signals received on the one or more communication input ports, are to transmit entangled photon pairs.

11. A method of for routing entangled photons pairs via a quantum networking system comprising: one or more entangled photon sources which generate a plurality of entangled photon pairs; a plurality N of optical output ports; a reconfigurable switching network connecting to the one or more entangled photon sources and the plurality of optical output ports, which comprises a regular repeating structure of optical crossbar switches and their interconnections for selectively routing individual ones of entangled photons pairs that are input to the network from the one or more entangled photon sources to and amongst the output ports; and a control module, the method comprising:
  receiving a request for entangled photons at the optical output ports;
  executing a routing algorithm to determine the state of the optical crossbar switches in the reconfigurable switching network to satisfy the request; and
  generating and transmitting electronic control signals to the reconfigurable switching network in order to set the states of the optical crossbar switches according to the executed routing algorithm.

12. The method of claim 11, wherein each of the optical crossbar switches has first and second inputs connected to adjacent interconnects feeding that switch and first and second outputs connected to adjacent interconnects exiting that switch, such that each switch is switchable between a first state in which the first switch input is connected to the first switch output and the second switch input is connected to the second switch output and a second state in which the first switch input is connected to the second switch output and the second switch input is connected to the first switch output.

13. The method of claim 11, wherein the one or more sources of entangled photon pairs output N/2 pairs of entangled photons for the N inputs to the network.

14. The method of claim 11, wherein the reconfigurable switching network comprises a N×N reconfigurable Beneš network formed of 2 $\log_2$ N–1 stages, each of N/2 switches, for a total of N $\log_2$ N–N/2 switches.

15. The method of claim 14, where the reconfigurable Beneš switching network comprises a reduced Beneš network in which the first stage of switches closest to the one or more entangled photon sources are removed and replaced with permanent connections replicating the "off" state of the switch such that there is a total of N $\log_2$ N–N switches.

16. The method of claim 14, executing a routing algorithm for the reconfigurable Beneš switching network comprising:
  sequentially defining a correspondence between photon labels and switch network outputs by repeatedly mapping the lowest unassigned positive photon label to the unassigned output with the lowest label, followed by mapping the corresponding negative photon label to the output that is to share entangled photon pairs with the previously determined output, and then repeating until all photon labels have been assigned, and performing a looping algorithm that for each photon label, routes the Beneš network input assigned to that photon label to the Beneš network output that is assigned to that photon label.

17. The method of claim 11, wherein the reconfigurable switching network comprises an N×N reconfigurable banyan-type network formed of $\log_2 N$ stages, each with N/2 switches, for a total of $N/2 \log_2 N$ switches.

18. The method of claim 17, wherein the reconfigurable banyan-type network comprises a reconfigurable banyan switch network, a reconfigurable baseline switch network, or a reconfigurable omega switch network.

19. The method of claim 17, where the reconfigurable banyan-type switching network comprises a reduced banyan network in which the one switch of each column of the network is removed and replaced by permanent connections replicating the "off" state of the switch such that there is a total of $(N/2-1)\log_2 N$ switches.

* * * * *